(12) United States Patent
Iwami et al.

(10) Patent No.: US 7,808,976 B2
(45) Date of Patent: *Oct. 5, 2010

(54) VOICE COMMUNICATION SYSTEM AND VOICE COMMUNICATION METHOD

(75) Inventors: Naoko Iwami, Machida (JP); Susumu Matsui, Machida (JP); Keiko Takahara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 177 days.

This patent is subject to a terminal disclaimer.

(21) Appl. No.: 11/907,848

(22) Filed: Oct. 18, 2007

(65) Prior Publication Data

US 2008/0049727 A1    Feb. 28, 2008

Related U.S. Application Data

(63) Continuation of application No. 11/717,062, filed on Mar. 13, 2007, which is a continuation of application No. 11/319,737, filed on Dec. 29, 2005, now Pat. No. 7,502,363, which is a continuation of application No. 09/836,299, filed on Apr. 18, 2001, now Pat. No. 7,167,467, which is a continuation of application No. 08/743,849, filed on Nov. 5, 1996, now Pat. No. 6,240,085, which is a continuation of application No. 08/357,189, filed on Dec. 13, 1994, now Pat. No. 5,604,737.

(30) Foreign Application Priority Data

Dec. 15, 1993    (JP)    .................................. 5-343162

(51) Int. Cl.
*H04L 12/66* (2006.01)
*H04M 11/00* (2006.01)

(52) U.S. Cl. .................................... 370/352; 379/93.09

(58) Field of Classification Search .................. 370/352; 379/93.09
See application file for complete search history.

(56) References Cited

U.S. PATENT DOCUMENTS 4,771,425 A    9/1988    Baran et al.

(Continued)

FOREIGN PATENT DOCUMENTS

JP    56-76657    6/1981

(Continued)

OTHER PUBLICATIONS

Yamauchi, Masaya, "Packet Switching Technique and Application", Institute of Electronics and Communication Engineers of Japan, Aug. 20, 1980, $1^{st}$ Ed., pp. 140-149, 278-279.
Gatenet: "A voice/Data Internet Transport System", I. Y. Chiou et al, IEEE 1986.
Translation of Relevant Part of Office Action dated Apr. 3, 2007.

*Primary Examiner*—Rasha S Al Aubaidi
(74) *Attorney, Agent, or Firm*—Mattingly & Malur, P.C.

(57) ABSTRACT

A voice communication system, which is connected to a LAN to which communication terminals are connected and to a public network to which telephones are connected, is provided with a communication server between the LAN and public network having different protocols from each other. The communication server enables a voice communication between a telephone on the public network and a communication terminal connected to the LAN by performing processing similar to that for a voice communication between two communication terminals connected to the LAN. The communication server determines whether an address of the other party inputted by a user is a communication terminal address or a telephone number, and transmits a voice communication request to a communication terminal of the other party when the address is a communication terminal address. When the address is a telephone number, the user acquires the communication terminal address of the communication server, and transmits a voice communication request to the communication server. Thereafter, the voice communication processing is performed through the communication server.

23 Claims, 20 Drawing Sheets

U.S. PATENT DOCUMENTS

| | | | |
|---|---|---|---|
| 4,942,602 A | 7/1990 | Baker, Jr. et al. |
| 4,995,073 A | 2/1991 | Okata et al. |
| 5,148,429 A | 9/1992 | Kudo et al. |
| 5,274,635 A | 12/1993 | Rahman et al. |
| 5,305,312 A | 4/1994 | Fornek et al. |
| 5,329,572 A | 7/1994 | Martens |
| 5,341,374 A | 8/1994 | Lewen et al. |
| 5,347,516 A | 9/1994 | Yoshida |
| 5,367,522 A | 11/1994 | Otani |
| 5,408,524 A | 4/1995 | Reum |
| 5,434,906 A | 7/1995 | Robinson et al. |
| 5,473,366 A | 12/1995 | Imaeda et al. |
| 5,533,102 A | 7/1996 | Robinson et al. |
| 5,568,540 A | 10/1996 | Greco et al. |
| 5,583,922 A | 12/1996 | Davis et al. |
| 5,602,846 A | 2/1997 | Holmquist et al. |
| 5,604,737 A | 2/1997 | Iwami et al. |
| 5,689,553 A | 11/1997 | Ahuja et al. |
| 6,240,085 B1 | 5/2001 | Iwami et al. |
| 2001/0043593 A1 | 11/2001 | Iwami et al. |

FOREIGN PATENT DOCUMENTS

| | | |
|---|---|---|
| JP | 58-215151 | 12/1983 |
| JP | 62-081847 | 4/1987 |
| JP | 62-130049 | 6/1987 |
| JP | 02-076344 | 3/1990 |
| JP | 03-107248 | 5/1991 |
| JP | 03-061791 | 6/1991 |
| JP | 04-363947 | 12/1992 |
| JP | 05-199320 | 8/1993 |
| JP | 59-011053 | 1/1994 |

FIG. 18

| EXTENSION NUMBER | COMMUNICATION TERMINAL ADDRESS |
|---|---|
| 1234 | 133. 144. 6. 10 |
| 3446 | 133. 144. 6. 9 |
| 5678 | 133. 144. 5. 1 |
| ⋮ | ⋮ |
| 8769 | 133. 144. 5. 6 |

311 312

| COMMUNICATION HEADER | IDENTIFIER OF CONNECTED TERMINAL DETERMINATION NOTICE COMMAND | RESULT | COMMUNICATION TERMINAL ADDRESS |
|---|---|---|---|

501 / 509 / 510 / 511

| NAME (337) | EXTENSION NUMBER (311) | COMMUNICATION TERMINAL ADDRESS (312) |
|---|---|---|
| TANAKA | 1234 | 133. 144. 6. 10 |
| SUZUKI | 3446 | 133. 144. 6. 9 |
| SATOH | 5678 | 133. 144. 5. 1 |
|  |  |  |
| AZUMA | 8769 | 133. 144. 5. 6 | ns to the packet switching network to the line switching network.

VOICE COMMUNICATION SYSTEM AND VOICE COMMUNICATION METHOD

CROSS-REFERENCES

This is a continuation application of U.S. Ser. No. 11/717,062, filed Mar. 13, 2007, which is a continuation application of U.S. Ser. No. 11/319,737, filed Dec. 29, 2005 now U.S. Pat. No. 7,502,363, which is a continuation application of U.S. Ser. No. 09/836,299, filed Apr. 18, 2001, now U.S. Pat. No. 7,167,467, which is a continuation application of U.S. Ser. No. 08/743,849, filed Nov. 5, 1996, now U.S. Pat. No. 6,240,085, which is a continuation application of U.S. Ser. No. 08/357,189, filed Dec. 13, 1994, now U.S. Pat. No. 5,604,737.

BACKGROUND OF THE INVENTION

The present invention relates to a voice communication system and method in communication terminals connected through a communication network.

As a conventional voice communication system, there is known a system which uses a line switching procedure through a line switching network such as a telephone network. For example, the standard thereof is indicated in CCITT (International Telegraph and Telephone Consultative Committee) Recommendation, ISDN, Q. 937. In this system, a communication terminal (telephone) connected to the line switching network transmits a voice communication request to a switching center dedicated to line switching processing, and the switching center receiving the request performs voice communication control for communication with a communication terminal (telephone) of the other party. Voice information sent at a constant speed is continuously transmitted and received through the switching center even during the voice communication.

In a packet switching network such as LAN (Local Area Network), in turn, the communication control is directly performed between communication terminals for transmitting and receiving packets. For example, Etherphone using Ethernet is well known.

However, due to the difference in schemes between the packet switching network and the line switching network, conventional voice communication systems such as that using the telephone network and so on cannot be utilized for realizing voice communication between communication terminals connected to the packet switching network.

To cope with this problem, a system for editing voice information into packets for transmission and reception between communication terminals has been proposed for adapting the voice communication scheme for communications between communication terminals connected to the packet switching network to the line switching network. However, even if the line switching network is connected with the packet switching network, a direct voice communication is not permitted between a communication terminal supporting voice communications between communication terminals connected to the packet switching network and a telephone connected to the line switching network and supporting the conventional voice communication function. This is due to the difference between the voice communication protocol of the packet switching network and the conventional voice communication protocol.

SUMMARY OF THE INVENTION

It is an object of the present invention to provide a voice communication system and a voice communication method which enable voice communication to be performed between a communication terminal connected to the packet switching network and a communication terminal connected to the line switching network.

It is another object of the present invention to provide a voice communication system and a voice communication method which enable voice communication, even initiated by a communication terminal connected to the packet switching network to a telephone connected to the line switching network and supporting the conventional voice communication functions, to proceed in the same manner as a voice communication between communication terminals connected to the packet switching network.

It is a further object of the present invention to provide a voice communication system and a voice communication method which can transmit a message in the form of an electronic mail instead of the voice communication in case a voice communication to a communication terminal connected to the packet switching network is prevented for some reason, without requiring a user to start another program or input a communication address.

It is a further object of the present invention to provide a voice communication system and a voice communication method which allows a telephone connected to the line switching network and supporting conventional voice communication functions to request a voice communication to a communication terminal connected to the packet switching network.

To achieve the above objects, according to one feature of the present invention, when a voice communication request is issued from a communication terminal connected to a packet switching network, if the address of the other party to which a user desires to have a voice communication, inputted by the user, is a communication terminal address (telephone number) of a telephone connected to a line switching network, communication control is performed between the communication terminal and a communication server to establish a connection between the communication terminal and the communication server. The communication server performs the communication control for a telephone connected to the line switching network to set a communication available state between the communication server and the telephone. This control enables a communication between the communication terminal and the telephone through the communication server. Thereafter, the communication server receives voice information transmitted from the telephone, edits the voice information into packets, and transmits the packets to the communication terminal. The communication server also receives packets transmitted from the communication terminal, and transmits voice information in the packets to the telephone. In this way, communication is carried out.

When a voice communication request is issued from a communication terminal connected to the packet switching network, if the address of the other party to which a user desires to have a voice communication, inputted by the user, is the address of another communication terminal connected to the packet switching network, the communication control is performed for a communication terminal having the communication terminal address, conventionally, to carry out the communication.

When a communication request is issued from a telephone connected to the line switching network to a communication terminal connected to the packet switching network, each of communication terminals connected to the packet switching network has previously been assigned a unique extension number, such that when the telephone number of the communication server is inputted from a telephone, the communication control is performed between the telephone and the communication server to create a communication available state between the telephone and the communication server, and an inputted extension number is transmitted from the telephone to the communication server. The communication server finds a communication terminal address from the extension number transmitted from the telephone, determines a communication terminal to be connected, and transmits a voice communication request to the communication terminal to establish a connection with the telephone. This enables communication between the telephone and the communication terminal through the communication server. Thereafter, the communication server receives voice information transmitted from the telephone, edits the voice information into packets, and transmits the packets to the communication terminal. The communication server also receives packets transmitted from the communication terminal, and transmits voice information in the packet to the telephone, thus carrying out the communication.

The communication server may comprise a table for finding a communication terminal address from an extension number. If a push-type telephone having ten-key and function buttons is used, the extension number may be inputted through the push buttons. For inputting an extension number, an oral guidance may be outputted from the communication server to the telephone, such that the user responsively inputs an extension number corresponding to a communication terminal with which the user desires to communicate.

When the line switching network is ISDN (Integrated Services Digital Network), a telephone may transmit a voice communication request including as a parameter an extension number for specifying a communication terminal to the communication server, such that the communication server finds the communication terminal address of a communication terminal to be connected from the extension number included in the voice communication request.

Instead of assigning an extension number, a unique telephone number may be assigned to each of communication terminals connected to the packet switching network. In this case, although these telephone numbers are actually assigned to the communication server, they are regarded as telephone numbers of communication terminals from the user. Then, when a telephone number of a communication terminal is inputted from a telephone, the communication control is performed between the telephone and the communication server, wherein the communication server finds a communication terminal address from the telephone number inputted from the telephone, determines a communication terminal to be connected, and transmits a voice communication request to the communication terminal. This control enables a communication between the telephone and the communication terminal through the communication server. Thereafter, the communication server receives voice information transmitted from the telephone, edits the voice information into packets, and transmits the packets to the communication terminal. The communication server also receives packets transmitted from the communication terminal, and transmits voice information in the packets to the telephone. In this way, communication is carried out.

Additionally, the communication server may include a table for finding a communication terminal address from a telephone number. Since a telephone number of each communication terminal is actually the telephone number of the communication server on the line switching network, the communication server is called when one of these telephone numbers is inputted from a telephone on the line switching network.

According to one aspect of the present invention, a communication terminal connected to the packet switching network may be one that encodes voice inputted through a voice input means, transmits the encoded voice information, and outputs received encoded voice information after decoding the same. In this case, the communication server decodes encoded voice information in the form of packets received from a communication terminal connected to the packet switching network, outputs the decoded voice information to the line switching network, encodes voice information received from the line switching network at a constant speed, edits the encoded voice information into packets, and transmits the packets to the communication terminal.

For issuing a communication request from a communication terminal connected to the packet switching network to another communication terminal, a voice communication request is first issued from the communication terminal. In this event, a voice communication negating response may be transmitted from the communication-terminal of the other party. This could be because nobody responds although the communication terminal of the other party is called. In this case, it is convenient if a mail can be transmitted to the communication terminal of the other party without requiring the inputting of the address of the other party. The mail may be unconditionally transmitted, or a guidance may be provided to the user of the communication terminal so as to allow the user to determine whether or not a mail is transmitted. The contents of the mail may be a fixed voice mail created by the system or an arbitrary mail inputted by the user.

For issuing a communication request from a telephone connected to the line switching network to a communication terminal connected to the packet switching network, a voice communication request is first issued from the telephone to the communication server. In this event, a guidance of a voice communication negating response may be returned from the communication server. This could be because nobody responded although the communication server called the communication terminal of the other party. In this case, it is convenient that a mail can be transmitted to the communication terminal of the other party without requiring the user to input the address of the other party. The mail may be unconditionally transmitted, or a guidance may be provided to the user of the telephone so as to allow the user to determine whether a mail should be transmitted. The mail may include a fixed contents created by the system or arbitrary contents inputted by the user.

Further, a communication terminal on the packet switching network may be used as a switcher terminal for managing the relationships between communication terminals connected to the packet switching network and communication terminal users. In this case, when the telephone number of the communication server is inputted from a telephone connected to the line switching network and supporting conventional voice communication functions, the communication server first creates a communication available state between the switcher terminal and the telephone. The user speaks with a switcher at the switcher terminal to specify a person with whom the user desires to communicate. Since the switcher terminal manages the relationships between respective communication terminals and users of these communication terminals, a corresponding communication terminal can be found from information which specifies the person with whom the user of the telephone desires to communicate. The address of the communication terminal is transmitted from the switcher terminal to the communication server. The communication server performs the communication control between the telephone and a communication terminal having the communication terminal address transmitted from the switcher terminal to establish a connection with the communication terminal. This control enables a communication between the communication terminal and the telephone through the communication server. Thereafter, the communication server receives voice information transmitted from the telephone, edits the voice information into packets, transmits the packets to the communication terminal. The communication server also receives packets transmitted from the communication terminal, and transmits voice information in the packets to the telephone.

It should be noted that the transmission and reception of control commands such as a voice communication start command, voice communication end command, and so on and the transmission and reception of voice packets between communication terminals on the packet switching network and between a communication terminal and the communication server, may be carried out through separate communication functions having different characteristics such as reliability, communication delay, and so on.

According to the voice communication system and voice communication method of the present invention, the other party to which the user requests a voice communication is determined to be a communication terminal connected to the packet switching network or a telephone connected to the line switching network in accordance with the address of the other party inputted by the user of a communication terminal connected to the packet switching network. If the user issues the request to a telephone connected to the line switching network, the communication server absorbs the difference between a voice communication protocol of the packet switching network and a conventional voice communication protocol of the line switching network. Stated another way, the communication server realizes the compatibility between different kinds of protocols. For this reason, even a voice communication initiated by a communication terminal connected to the packet switching network to a telephone connected to the line switching network and supporting the conventional voice communication function can be carried out in the same manner as a voice communication between communication terminals connected to the packet switching network.

Also, since an extension number or a telephone number of a communication terminal connected to the packet switching network is inputted from a telephone connected to the line switching network such that the communication server finds a communication terminal address corresponding to the extension number or the telephone number and connects the telephone to the communication terminal, a voice communication may be requested to a communication terminal connected to the packet switching network from a telephone connected to the line switching network and supporting the conventional voice communication functions.

In case a voice communication to a communication terminal was prevented for some reason, a mail may be used instead of the voice communication to send a message without requiring the user to start another program or input a communication address.

BRIEF DESCRIPTION OF THE DRAWINGS

FIG. 18 shows the structure of an extension number management table;

DESCRIPTION OF THE PREFERRED EMBODIMENTS

An embodiment of the present invention will hereinafter be described with reference to the accompanying drawings.

Figure 1:
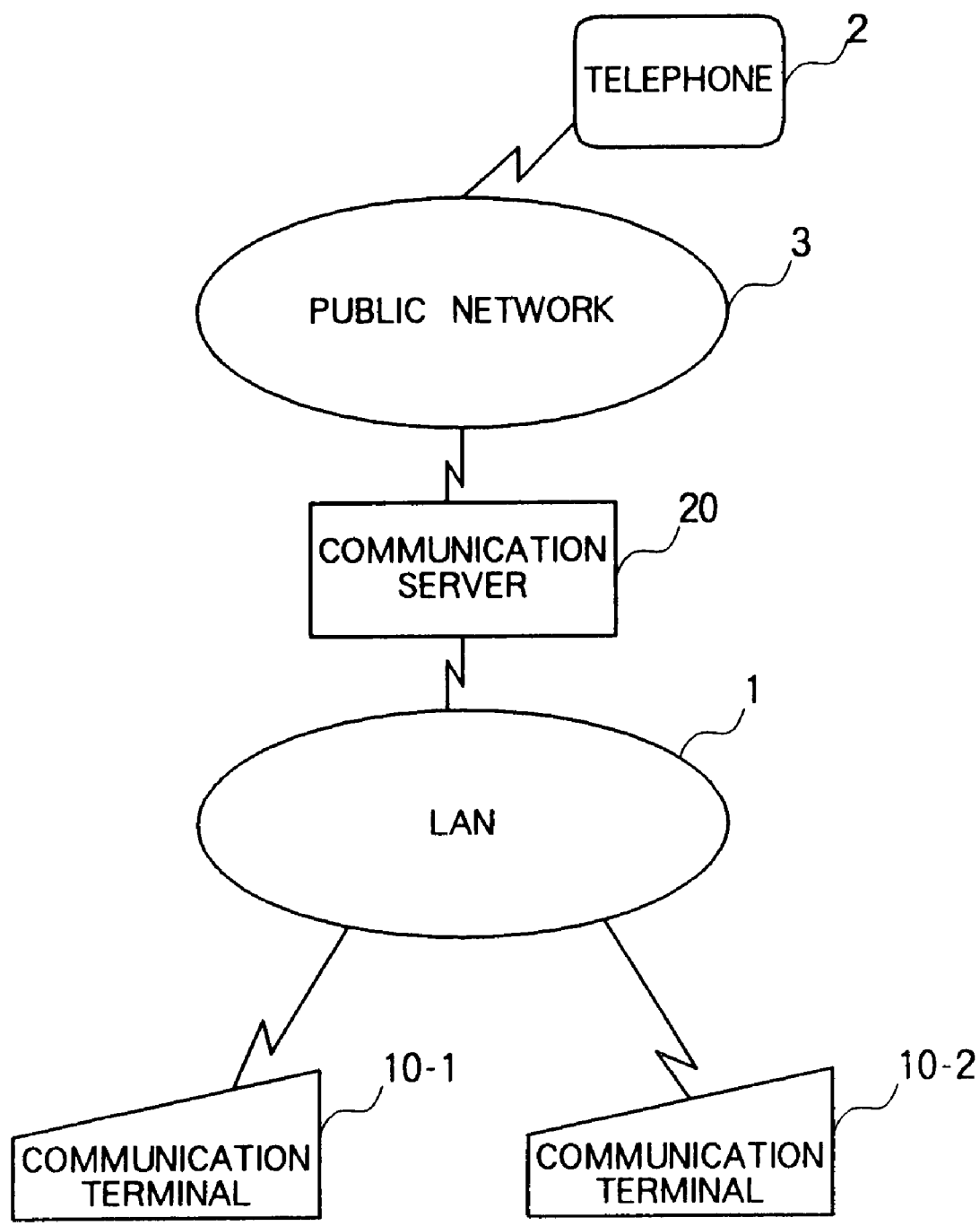
FIG. 1 is a block diagram showing the whole configuration of a voice communication system according to an embodiment of the present invention.

FIG. 1 shows the whole configuration of a voice communication system according to an embodiment of the present invention, including communication terminals 10-1, 10-2 for performing communications; LAN (Local Area Network) 1 to which the communication terminals 10-1, 10-2 are connected; a telephone 2; a public network 3; and a communication server 20 which is connected simultaneously to the public network 3 and the LAN 1.

It will be of course understood that while one telephone 2 and two communication terminals 10-1, 10-2 (hereinafter, an arbitrary communication terminal will be denoted by reference numeral 10) only are shown in FIG. 1, more telephones and communication terminals may be connected.

Figure 2:
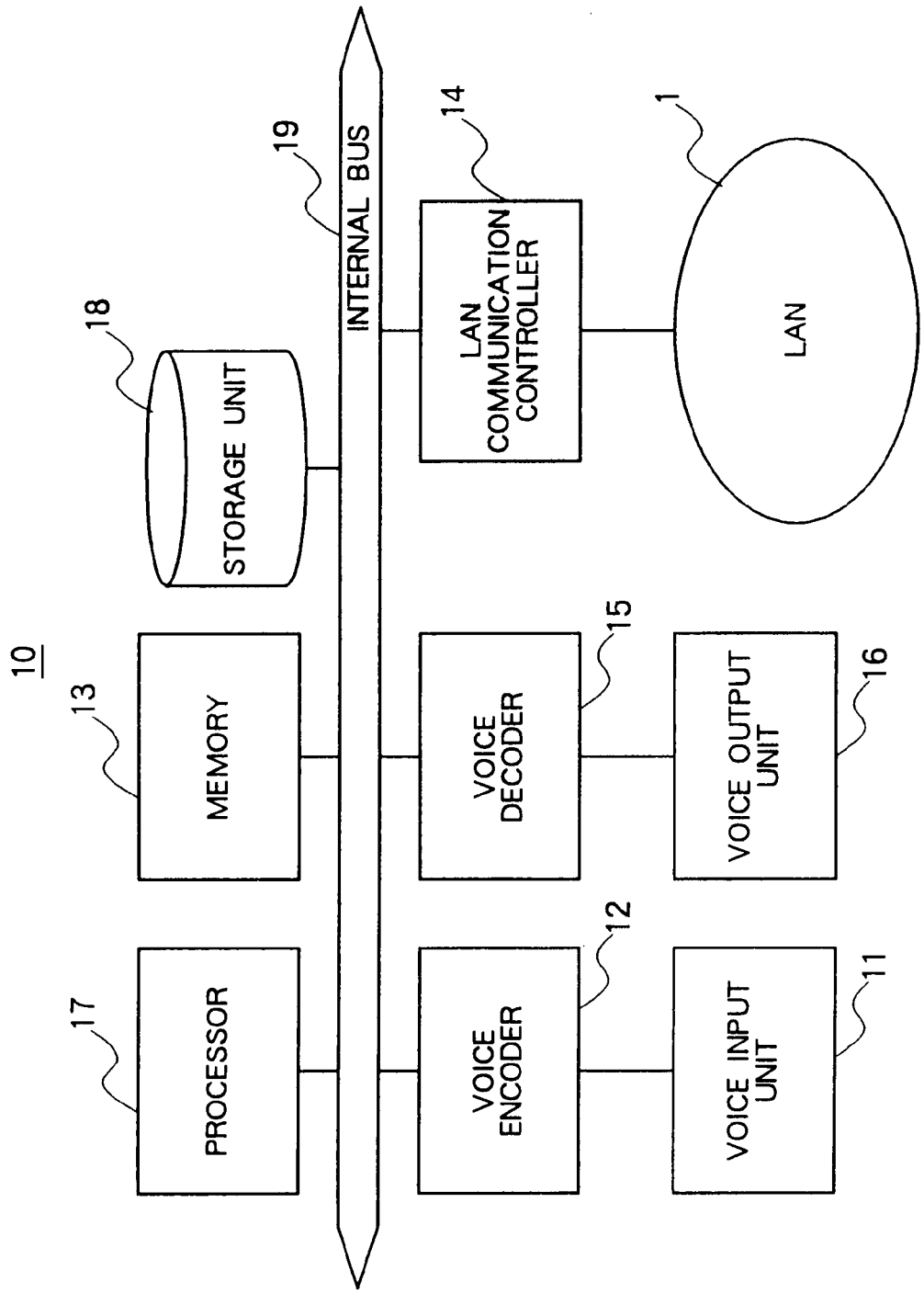
FIG. 2 is a block diagram showing the configuration of a communication terminal in FIG. 1.

FIG. 2 shows in a block diagram form the configuration of the communication terminal 10 in FIG. 1. The communication terminal 10 comprises a voice input unit 11; a voice encoder 12; a memory 13; a LAN communication controller 14; a voice decoder 15; a voice output unit 16; a processor 17; and a storage unit 18. The LAN communication controller 14 is connected to the LAN 1. The voice encoder 12, voice decoder 15, LAN communication controller 14, memory 13, storage unit 18, and processor 17 are mutually connected through an internal bus 19.

The voice input unit 11 is provided for inputting voice information. Inputted voice information is encoded by the voice encoder 12. Coded voice information outputted from the voice encoder 12 is read into the memory 13, subjected to voice communication control processing, and then inputted to the LAN communication controller 14. Then, the LAN communication controller 14 transmits the encoded voice information to a communication terminal on the reception side through the LAN 1.

On the other hand, encoded voice information transmitted from the communication terminal on the transmission side through the LAN 1 is read into the memory 13 from the LAN communication controller 14, subjected to voice communication control processing, and inputted to the voice decoder 15 which decodes the encoded voice information inputted thereto. The decoded voice information is inputted to the voice output unit 16. In this way, the received voice is outputted.

The voice communication control processing in the communication terminal 10 is carried out by the processor 17 executing a predetermined program based on voice communication control processing information stored in the storage unit 18. The voice communication control processing in the communication terminal 10 will be late described in detail.

Figure 3:
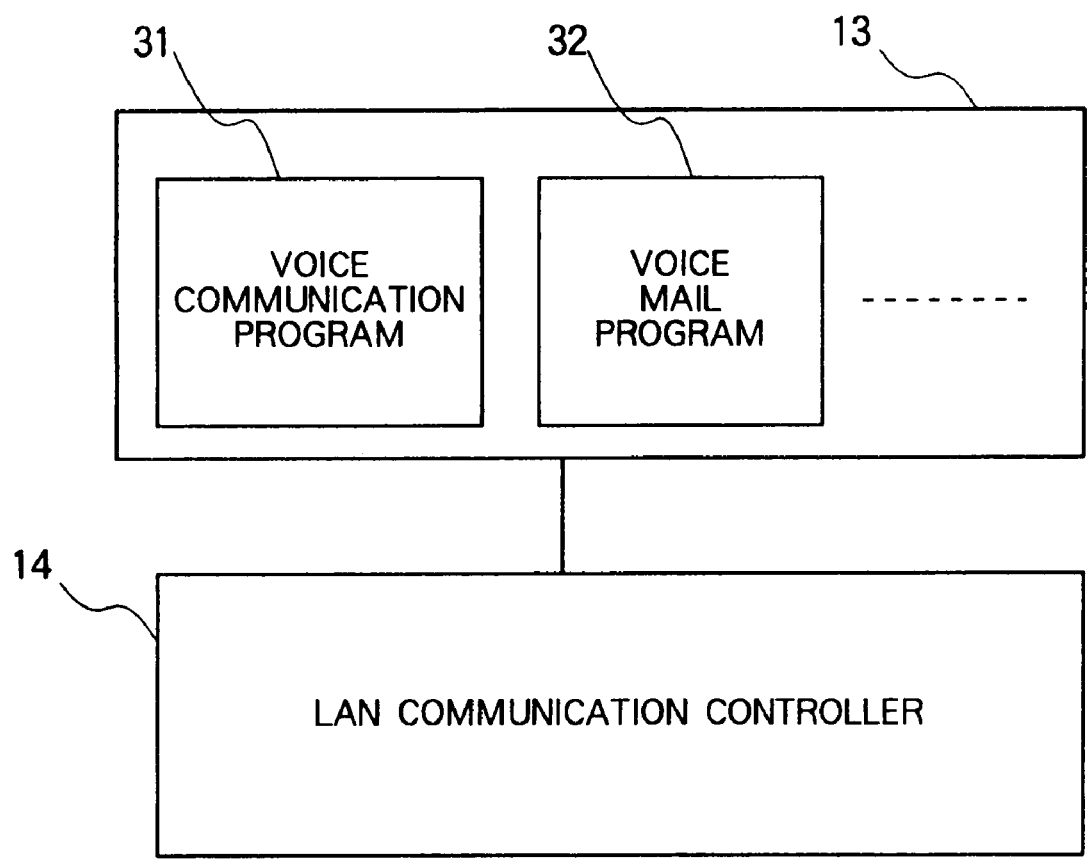
FIG. 3 is a block diagram showing the allocation of programs in a memory of the communication terminal.

FIG. 3 shows in a block diagram form the allocation of programs in the memory 13. The memory 13 stores a voice communication program 31 for voice communication control processing and a voice mail program 32.

The voice communication program 31 is a program for receiving a voice communication request from a user or a voice communication request from another communication terminal through the LAN communication controller 14 connected to the internal bus 19, transmitting and receiving voice packets to and from a communication terminal of the other party, and providing voice communication functions similar to those of the telephone. The voice mail program 32 is a program for providing mail management functions such as transmission and reception of voice mails.

Figure 4:
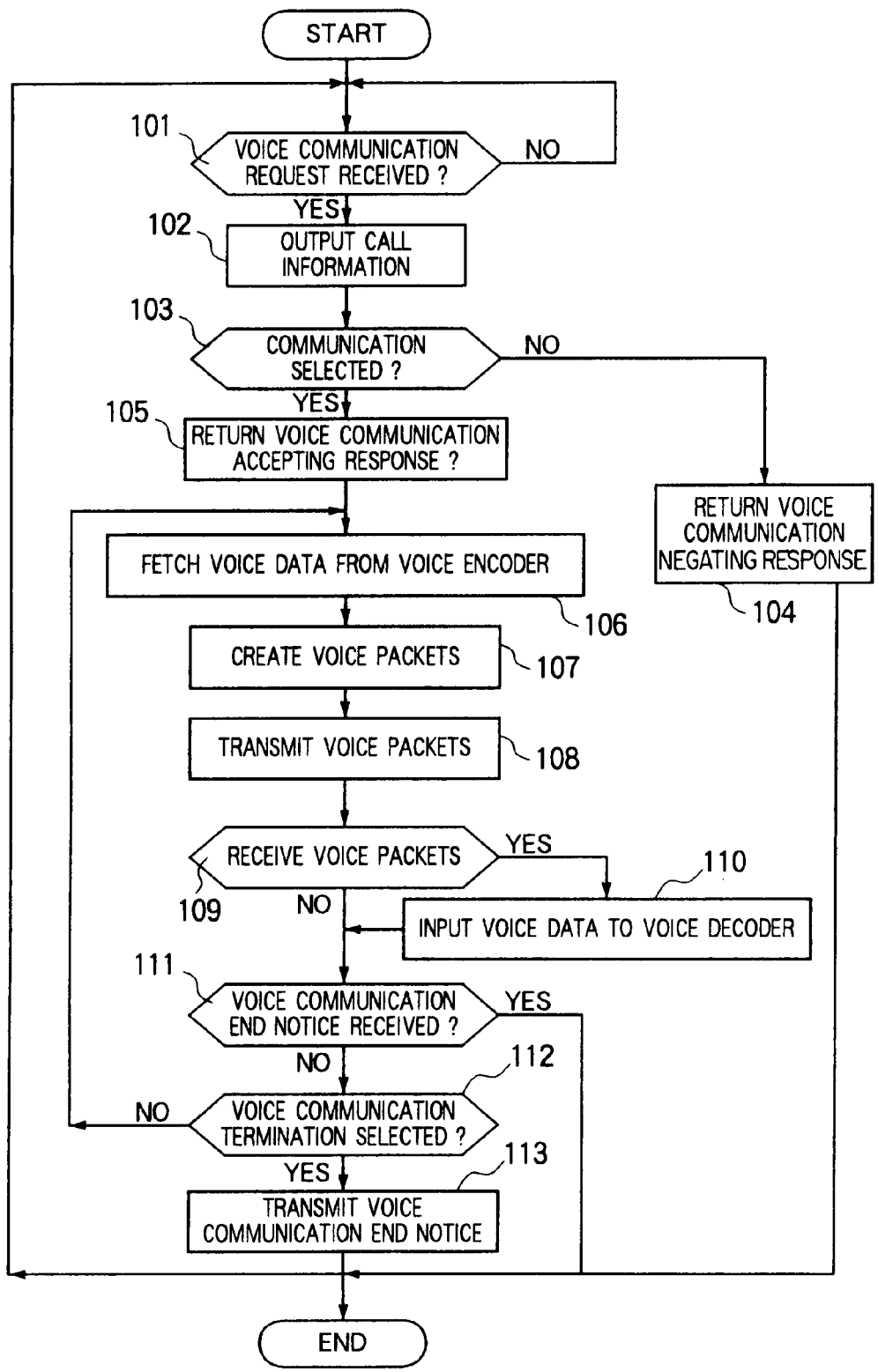
FIG. 4 is a flow chart showing the processing of a voice communication program on the communication terminal for starting a voice communication, upon receiving a voice communication request from another communication terminal.

FIG. 4 is a flow chart showing the voice communication control processing performed by the voice communication program 31 on the communication terminal 10 for starting a voice communication when the communication terminal 10 has received a voice communication request form another communication terminal.

First, the program 31 determines at step 101 whether or not the communication terminal 10 is receiving a voice communication request from another communication terminal. If the communication terminal 10 is not receiving the voice communication request, the program 31 waits for the voice communication request to be received by the communication terminal. If, at step 101, the communication terminal 10 has received the voice communication request from another communication terminal, the user is informed at step 102 that the voice communication request has reached by displaying the information on the screen, generating an audio output, and so on. Then, the program 31 determines at step 103 whether or not the user has selected the communication.

If the user has selected to reject the communication or does not respond to the request for a predetermined time at step 103, a voice communication negating response is returned to the communication terminal which has sent the voice communication request at step 104, followed by the program 31 returning to step 101 to wait for the reception of the voice communication request from another communication terminal. If the user has selected to accept the communication at step 103, the communication terminal 10 returns a voice communication accepting response at step 105, thus establishing a connection between the communication terminal 10 and the external communication terminal which has sent the voice communication request. Subsequently, the communication processing after step 106 is started.

Specifically, encoded voice information is fetched from the voice encoder 12 (FIG. 2) at step 106, voice packets are created from the fetched encoded voice information at step 107, and the voice packets are transmitted to the communication terminal of the other party which has issued the voice communication request at step 108. Then, the voice communication program 31 on the communication terminal 10 determines at step 109 whether or not the voice packets from the communication terminal of the other party have been received.

If the voice packets have been received at step 109, encoded voice information in the voice packets are inputted to the voice decoder 15 (FIG. 2) at step 110. If the voice packets have not been received at step 109, or after the encoded voice information has been inputted to the voice decoder 15 at step 110, the program 31 determines at step 111 whether or not a voice communication end notice from the communication terminal of the other party has been received. If the voice communication end notice has been received, the communication is terminated, and the program again waits for the reception of another voice communication request from a communication terminal at step 101.

If the voice communication end request has not been received at step 111, the program 31 checks at step 112 whether or not the user has selected to terminate the voice communication. If the user has not selected the termination of the voice communication, the communication processing is continued from step 106. Conversely, if the user has selected the termination of the voice communication at step 112, a voice communication end notice is transmitted to the communication terminal of the other party to terminate the communication at step 113. Then the program 31 again returns to step 101 to wait for the reception of another voice communication request from a communication terminal.

While the foregoing processing procedure shows the voice communication control processing performed when the communication terminal has received a voice communication request from another communication terminal for starting the voice communication, it should be noted that "another communication terminal" herein referred to includes the communication server 20 in addition to the other communication terminals 10 connected to the LAN 1 in FIG. 1. Stated another way, the foregoing processing procedure does not distinguish the communication server 20 and other communication terminals 10 and treats them as the same communication terminals. A voice communication request from the communication server 20 means a request from a telephone 2 connected to the public network 3, as will be later described.

Figure 5:
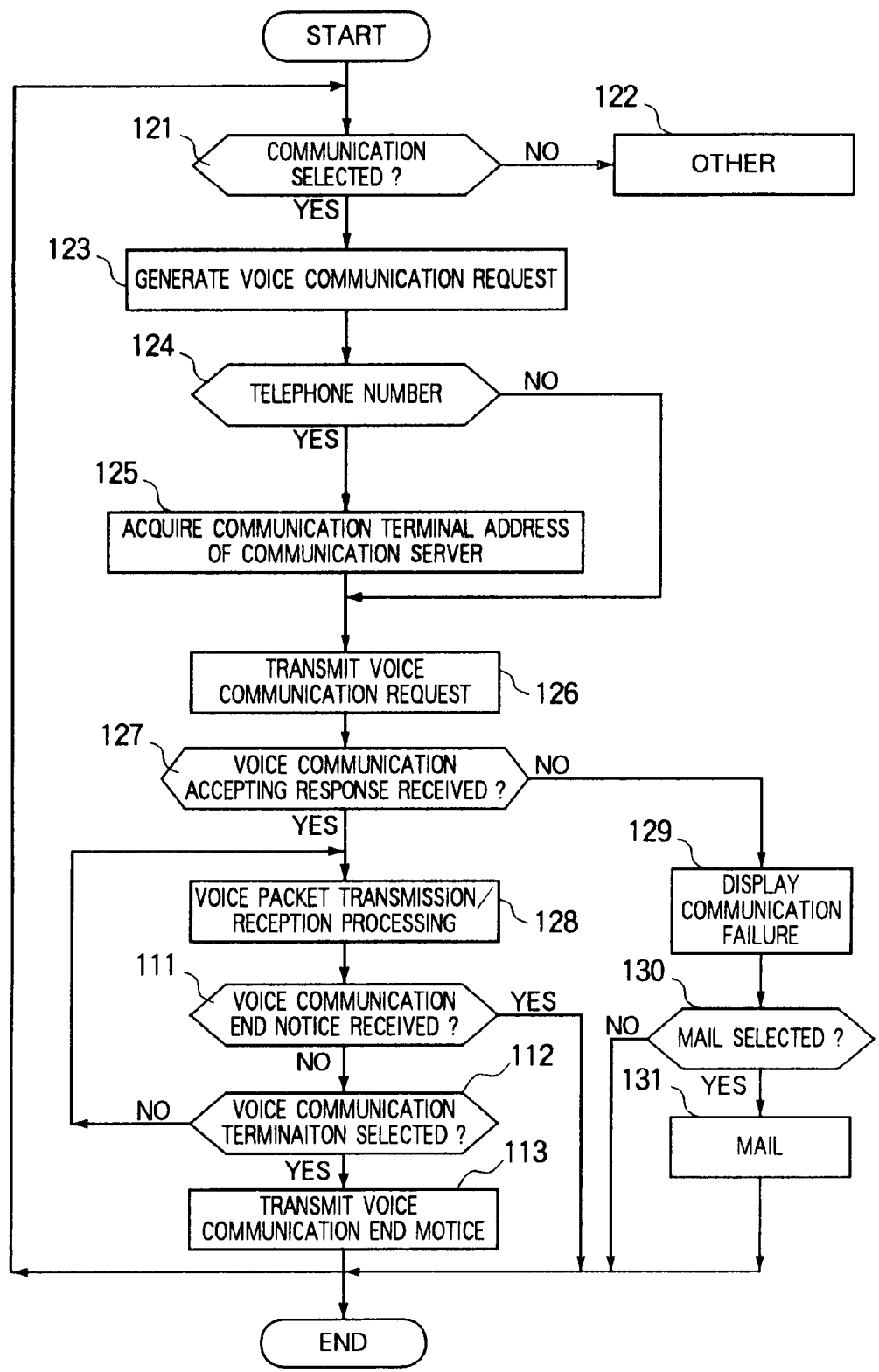
FIG. 5 is a flow chart showing the processing of the voice communication program on the communication terminal for starting a voice communication by a request of the user.

FIG. 5 shows a flow chart of the voice communication control processing performed when the voice communication program 31 on the communication terminal 10 starts a voice communication by a request of the user.

Steps 111-113 in FIG. 5 are the same as steps 111-113 in FIG. 4, and step 128 in FIG. 5 is a collection of steps 106-110 in FIG. 4.

First, the voice communication program 31 determines at step 121 whether or not the user has selected the communication processing. If the user has selected an item other than the communication processing, the program 31 performs other processing in response to the selection at step 122. If the user has selected the communication processing at step 121, a voice communication request is generated at step 123 using the address of the other party inputted by the user. A detailed format of the voice communication request will be later described with reference to FIG. 13. Next, the program 31 determines at step 124 whether or not the address of the other party with whom the user desires to speak is a telephone number consisting only of a sequence of numeric characters.

At step 124, if the address of the other party inputted by the user is a telephone number consisting only of a sequence of numeric characters, this means that the user has requested a voice communication with a telephone 2 connected to the external public network 3 through the communication server 20. In this case, the program 31 acquires at step 125 the communication terminal address assigned to the communication server 20 which has previously been stored in the storage unit 18 (FIG. 2), and treats the communication server 20 as the other party for the communication in the subsequent processing.

Conversely, if the address of the other party inputted by the user is not a telephone number consisting only of a sequence of numeric characters, the address of the other party can be regarded as the address of a communication terminal on the LAN 1. Therefore, this means that the user has issued a voice communication request to another communication terminal 10 connected to the LAN 1. In this case, the program 31 proceeds the processing, while treating the other communication terminal as the other party for the communication.

After determining at steps 124 and 125 the other party to be communicated, for which the voice communication processing is performed, a voice communication request is generated and transmitted to the communication terminal of the other party at step 126. The destination of the voice communication request is the communication server 20 when the other party is a telephone, and the communication terminal itself when the other party is the communication terminal. After step 126, the program 31 determines at step 127 whether or not a voice communication accepting response has been received from the communicating party. If the voice communication accepting response has been received, this means that the connection has been established, so that the communication processing after step 128 is executed. Since the communication processing after step 128 is the same as the foregoing procedure described in connection with FIG. 4, explanation thereon will be omitted.

If no voice communication accepting response has reached at step 127, a failure of communication connection is displayed at step 129. Then, the program 31 determines at step 130 whether or not the user requests to send a voice mail to the other party with whom the communication connection has been failed. If the user requests to send the voice mail, an inputted message is transmitted using the voice mail program 32 at step 131, and the program 31 again returns to step 121 to receive a selection of the user. If no voice mail sending is requested at step 130, the program 31 immediately returns to step 121.

It should be noted that a telephone number inputted by the user at step 121 may include '(', ')', or '-'. In this case, upon determining at step 124 whether or not the address is a telephone number, a sequence of numeric characters including '(', ')', or '-' is also determined to be a telephone number. Further in this case, steps 130-131 may be omitted. At steps 130-131, a text mail or multimedia mail may be used instead of the voice mail.

Figure 6:
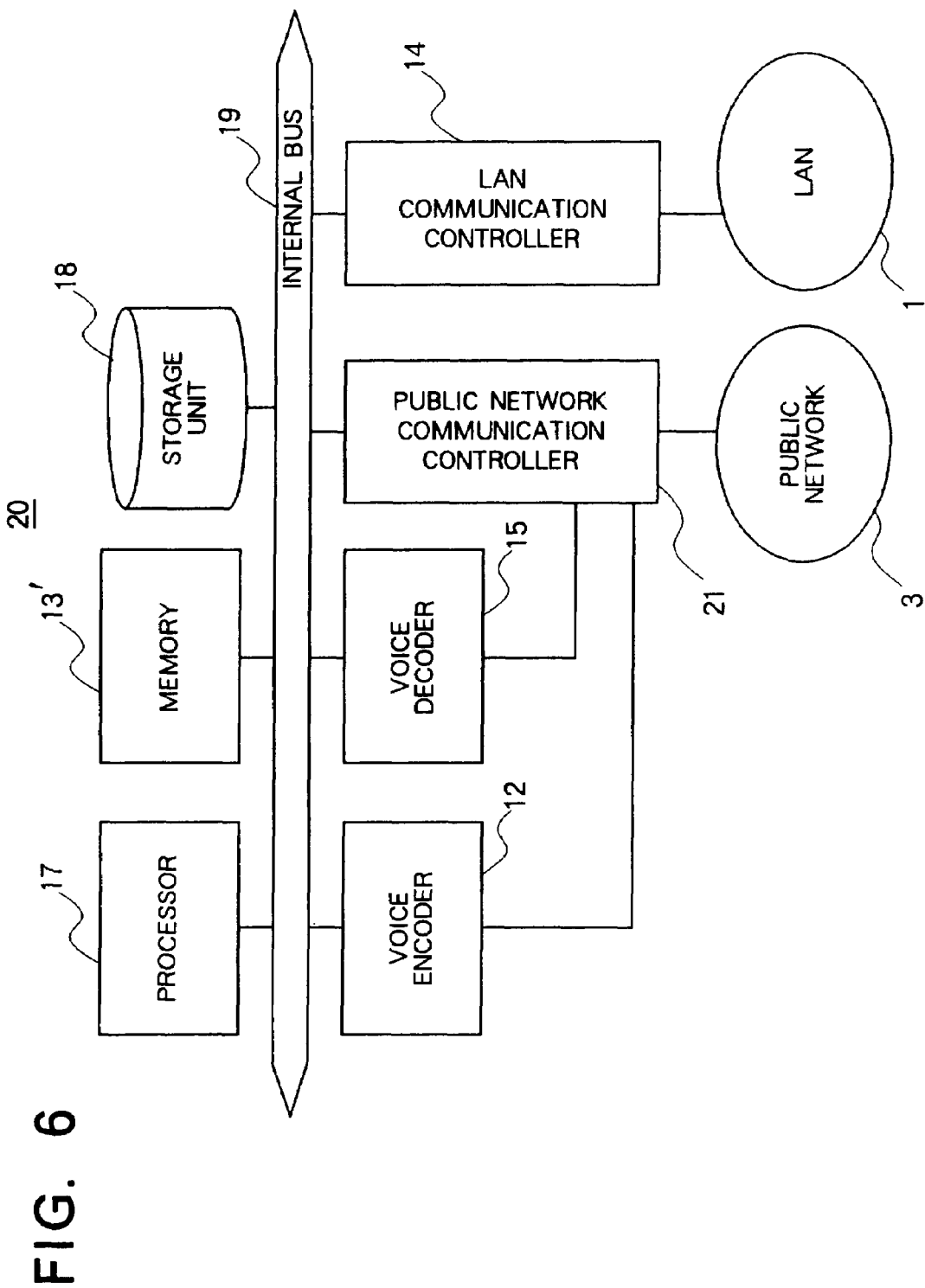
FIG. 6 is a block diagram showing the configuration of a communication server.

FIG. 6 shows in a block diagram form the configuration of the communication server 20 in FIG. 1. The communication server 20 comprises a voice encoder 12; a memory 13'; a LAN communication controller 14; a voice decoder 15; a processor 17; a storage unit 18; and a public network communication controller 21. The LAN communication controller 14 is connected to the LAN 1, while the public network communication controller 21 is connected to the public network 3. The voice encoder 12, voice decoder 15, public network communication controller 21, LAN communication controller 14, memory 13', storage unit 18, and processor 17 are mutually connected through an internal bus 19.

Voice information transmitted through the public network from a telephone is inputted to the voice encoder 12 through the public network communication controller 21. The voice encoder 12 encodes the inputted voice information and outputs the encoded voice information. The encoded voice information outputted from the voice encoder 12 is read into the memory 13', subjected to voice communication control processing, and then inputted to the LAN communication controller 14 which transmits the inputted encoded voice information to a communication terminal through the LAN 1.

On the other hand, encoded voice information transmitted through the LAN 1 from a communication terminal is read into the memory 13' from the LAN communication controller 14, subjected to the voice communication control processing, and then inputted to the voice decoder 15. The voice decoder 15 decodes the encoded voice information inputted thereto. The decoded voice information is inputted to the public network communication controller 21 which in turn transmits the voice represented by the voice information through the public network 3 to a telephone.

The voice communication control processing in the communication server 20 is carried out by the processor 17 which executes a predetermined program based on voice communication control processing information stored in the storage unit 18. This voice communication control processing in the communication server 20 will be described later in detail.

Figure 7:
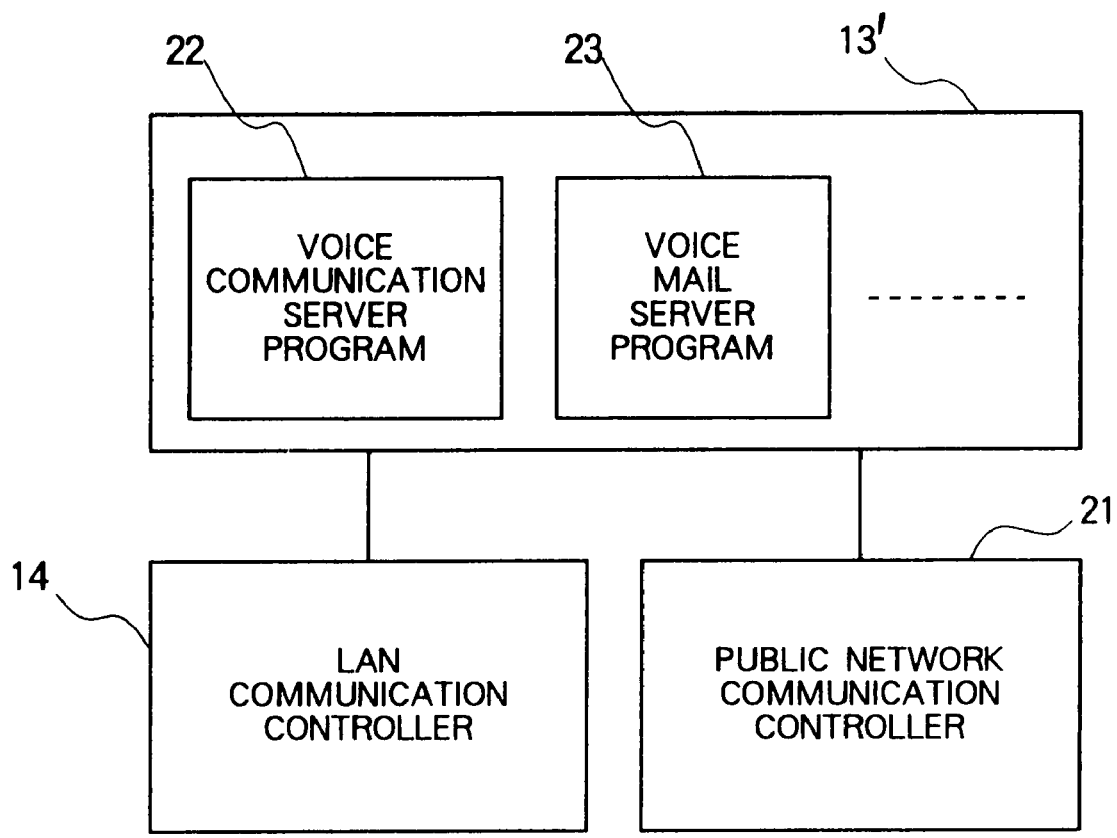
FIG. 7 is a block diagram showing the allocation of programs in a memory of the communication server.

FIG. 7 shows the allocation of programs in the memory 13' of the communication server 20. The memory 13' of the server 20 stores a voice communication server program 22 for the voice communication control processing and a voice mail server program 23.

The voice communication server program 22 is a program for accepting a call setting request from a telephone received from the public network communication controller 21 or a voice communication request from a communication terminal through the LAN communication controller 14 connected to the internal bus 19, editing voice packets transmitted from the telephone into voice packets, transmitting the voice packets to the communication terminal, converting voice packets received from the communication terminal to voice information, and transmitting the voice information to the telephone, thus providing voice communication functions between the communication terminal connected to the LAN 1 and the telephone connected to the public network 3, similar to the conventional functions between telephones.

The voice mail server program 23 is a program for providing a voice mail functions of voice mail.

Figure 8:
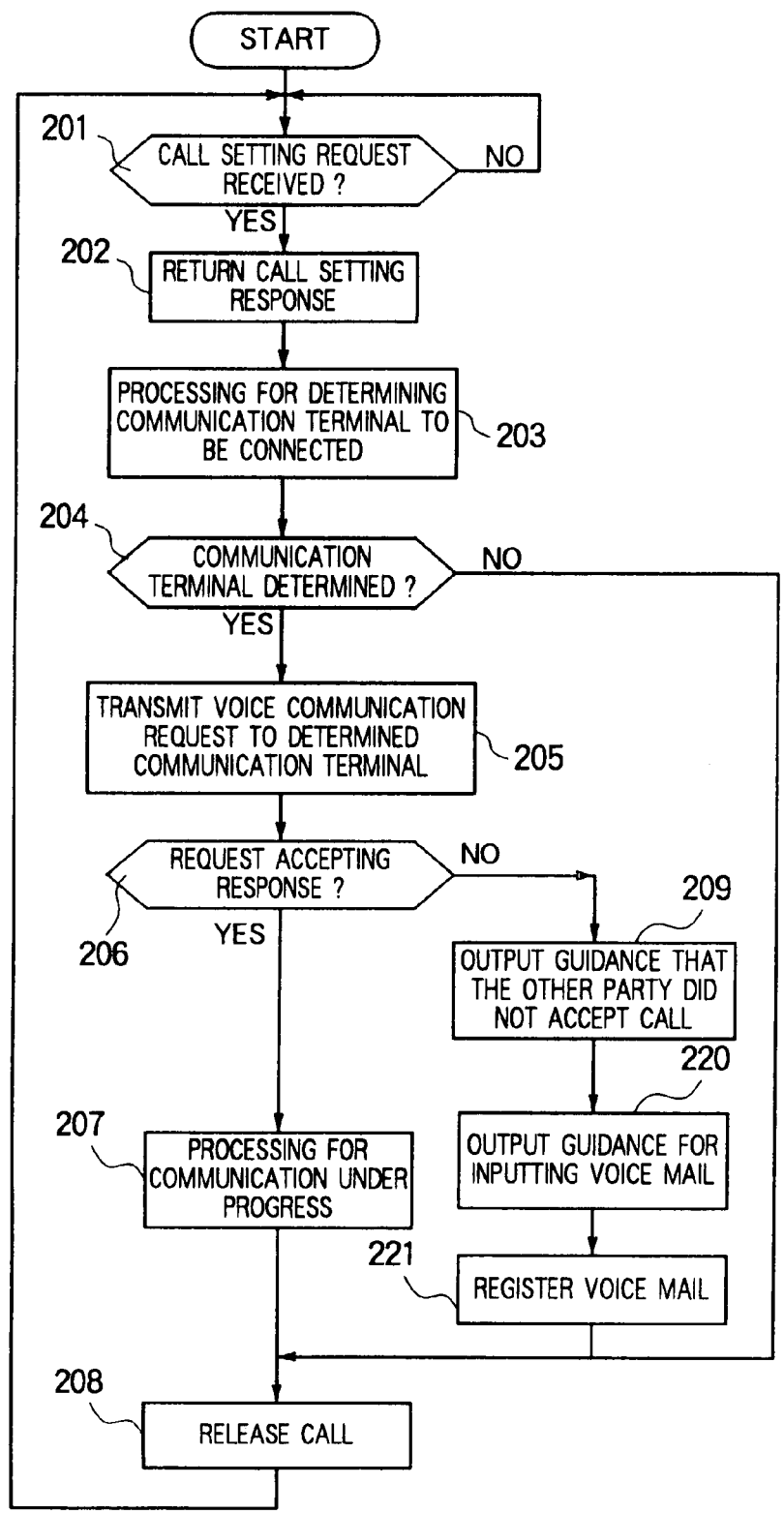
FIG. 8 is a flow chart showing the processing of a voice communication program on the communication server for starting a voice communication between a communication network on LAN and the telephone, upon receiving a call setting request from a telephone connected to a public network.

FIG. 8 is a flow chart schematically showing the voice communication control processing performed when the voice communication server program 22 on the communication server 20 has received a call setting request from a telephone 2 connected to the public network 3 (FIG. 1) for starting a voice communication between the telephone 2 and a communication terminal 10 connected to the LAN 1.

First, the program 22 determines at step 201 whether or not a call setting request from the public network 3 has been received. If the call setting request has not been received, the program 22 continuously waits for the call setting request from the public network 2 at step 201. If a call setting request has been received at step 201, a call setting response is returned to the public network 3 at step 202 to set a call (whereby a communication available state is set between the communication server 20 and the telephone), and the program executes at step 203 processing for determining a communication terminal to be connected.

The processing for determining a communication terminal to be connected at step 203 determines which of communication terminals 10 connected to the LAN 1 the user utilizing the telephone 2, who has issued the call setting request, desires to communicate with. Details of the processing will be later explained in detail with reference to FIG. 17 and so on.

Subsequent to step 203, the program 22 determines at step 204 whether or not a communication terminal with which the user desires to communicate has been determined. If it has not been determined, the call is released at step 208, and the program 22 again waits for a call setting request to be received from the public network 3.

If, at step 204, a communication terminal with which the user desires to communicate has been determined, a voice communication request is transmitted to the communication terminal at step 205, and then the program 22 determines at step 206 whether or not a voice communication accepting response has been received from the communication terminal of the other party. If the accepting response has been received, which means that a connection between the communication server 20 and the communication terminal has been established, the processing during the communication is performed at step 207. After the communication is terminated, the call is released at step 208, followed by the program 22 returning to step 201 to again wait for the communication server 20 to receive a call setting request from the public network 3. The processing during the communication at step 207 will be later described in detail with reference to FIG. 10.

At step 206, if the voice communication negating response has been received from the communication terminal of the other party, a voice message guiding that the other party did not accept the call is sent at step 209 to the telephone which has issued the call setting request. Then, a guidance for inputting a voice mail is outputted to the telephone user at step 220, an inputted message is registered at step 221 in the voice mail server program 23 in FIG. 7 as a voice mail, and the call is released at step 208. Then, the program 22 again returns to step 201 to wait for the communication server 20 to receive a call setting request from the public network 3.

It should be noted that steps 220-221 may be omitted, and the voice mail server program 23 may be located on a different communication terminal.

Figure 9:
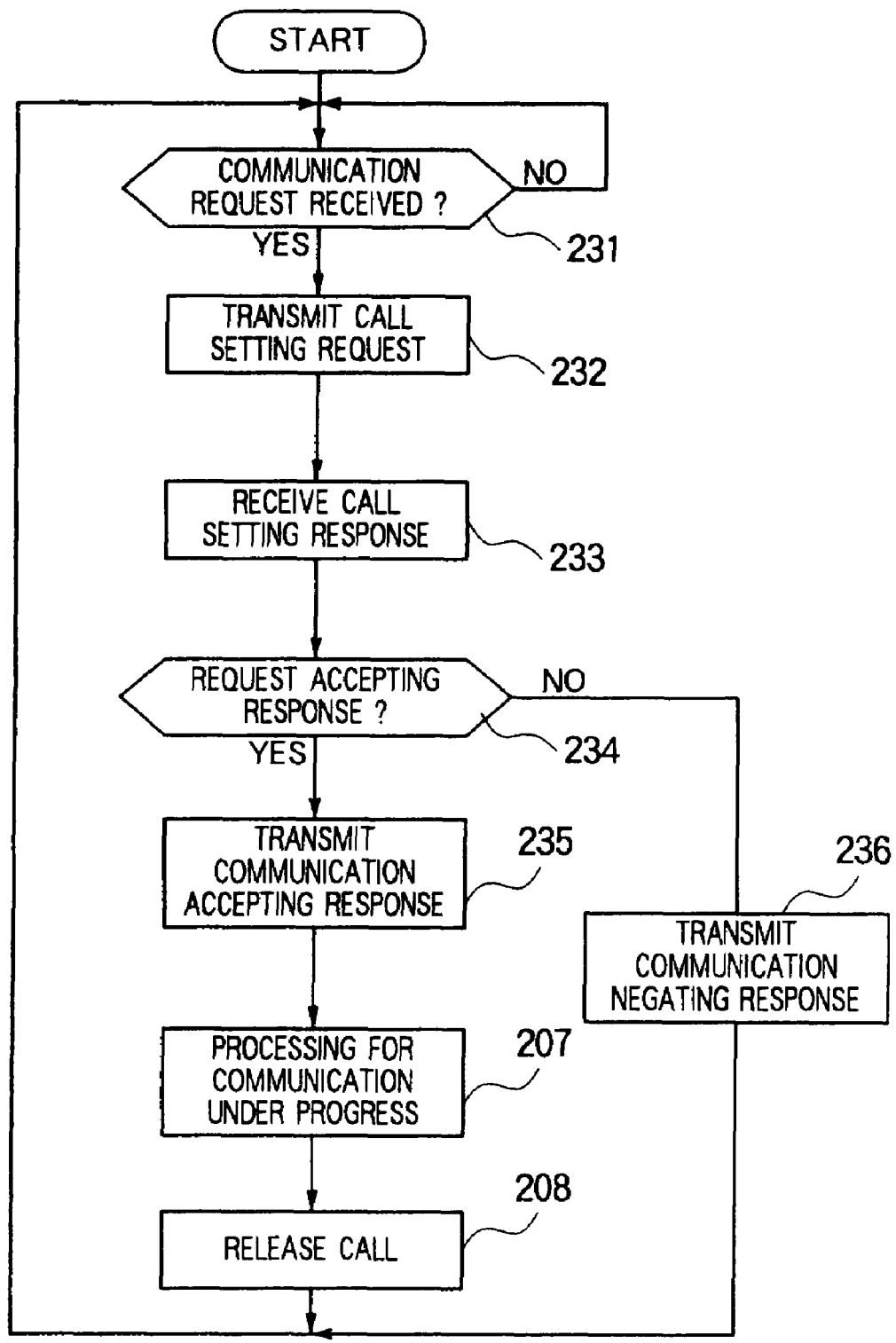
FIG. 9 is a flow chart showing the processing of the voice communication program on the communication server for starting voice communication between the communication terminal on LAN and a telephone, upon receiving a voice communication request from a communication terminal on LAN.

FIG. 9 is a flow chart schematically showing the voice communication control processing performed when the voice communication server program 22 on the communication server 20 has received a voice communication request from a communication terminal connected to the LAN 1 for starting a voice communication between the communication terminal 10 and a telephone 2 connected to the public network 3. Since steps 207 and 208 are the same as those in FIG. 8, explanation thereon will be omitted.

First, the program 22 determines at step 231 whether or not a voice communication request has been received from a communication terminal 10 connected to the LAN 1. If the voice communication request has not been received from a communication terminal 10, the program 22 remains at step 231 and waits for the voice communication request to be received from a communication terminal 10 connected to the LAN 1. If the voice communication request has been received at step 231, a call setting request is transmitted to the public network 3 for connection with a telephone 2 having the telephone number specified in the voice communication request.

After a call setting response has been received from the public network 3 at step 233, the program 22 determines at step 234 whether or not the response is an accepting response. If it is the accepting response, a voice communication accepting response is returned to the communication terminal 10 at step 235, and the communication processing after step 207 is performed. At step 234, if the response is a negating response, a voice communication negating response is transmitted to the communication terminal 10 at step 236, and then the program 22 returns to step 231 to again wait for a voice communication request to be received from a communication terminal 10 connected to the LAN 1.

Figure 10:
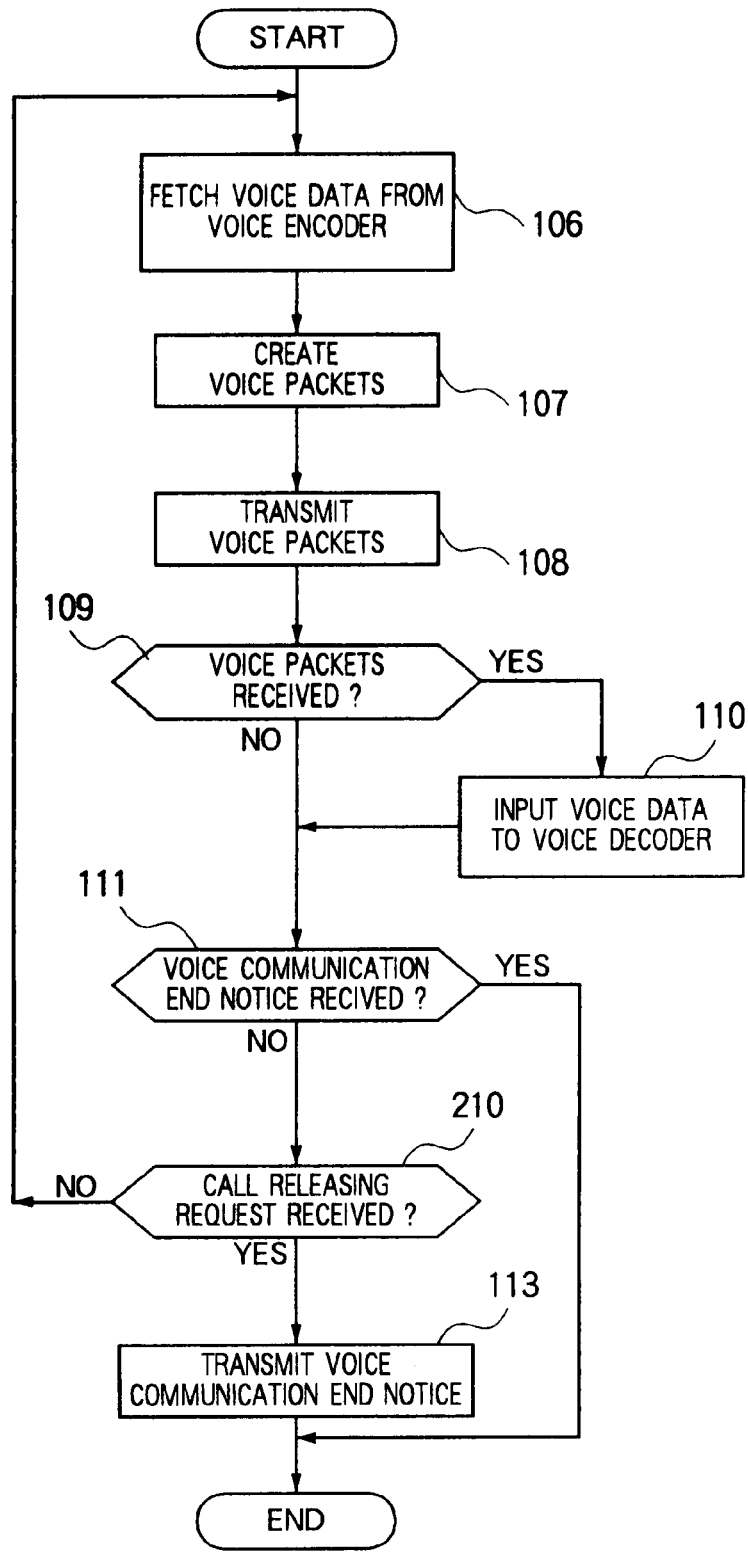
FIG. 10 is a flow chart showing the processing performed during a communication.

FIG. 10 is a flow chart of the processing performed in the communication server 20 during a communication which has been shown in step 207 in FIGS. 8 and 9.

Steps 106-108 in FIG. 10 are the same as steps 106-108 shown in FIG. 4 executed in the communication terminal. Specifically, these steps perform the processing for encoding voice data inputted from a telephone 2 to the public network communication controller 21 (FIG. 6) through the public network 3 by the voice encoder 12, creating voice packets, and transmitting the voice packets to a communication terminal 10 through the LAN 1.

Steps 109, 110 in FIG. 10 perform the same processing as steps 109, 110 shown in FIG. 4 executed in the communication terminal. Specifically, these steps perform the processing for decoding voice packets inputted from a communication terminal 10 to the LAN communication controller 14 (FIG. 6) through the LAN 1 by the voice decoder 15 and transmitting the decoded voice information to the telephone 2 through the public network 3.

Steps 111, 210, 113 in FIG. 10 correspond to steps 111, 112, 113 in FIG. 4.

Specifically, the voice communication program 22 on the communication server 20 determines at step 111 whether or not a voice communication end notice has been received from the communication terminal 10. If the voice communication end notice has been received, the processing during the communication is terminated. Conversely, if the voice communication end notice has not been received at step 111, the program 22 determines at step 210 whether or not a call releasing request has been received from the public network 3. If the call releasing request has not been received from the public network 3, the communication processing after step 106 is continued. Conversely, at step 210, if the call releasing request has been received from the public network 3, a voice communication end notice is transmitted to the communication terminal 10 at step 113, followed by terminating the communication.

Figure 11:
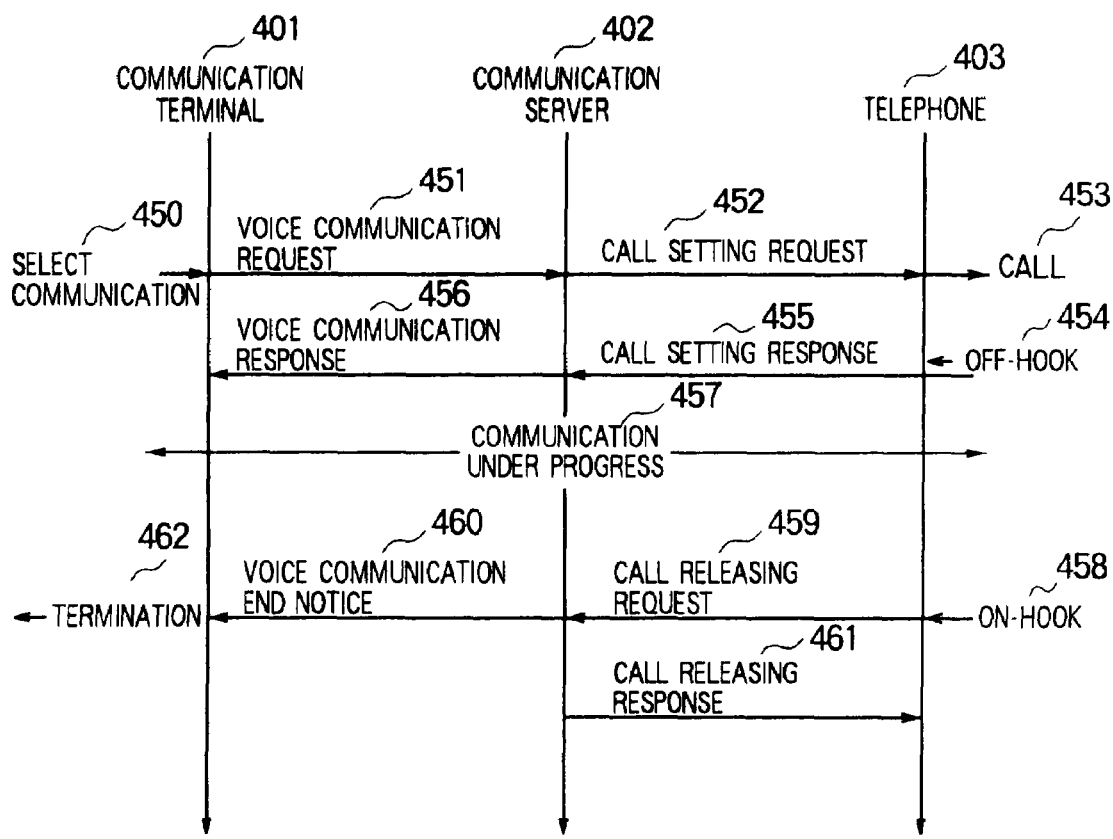
FIG. 11 is a sequence diagram showing a procedure followed by a communication terminal connected to the LAN for making a call to a telephone through the communication server by a request from a communication terminal on the LAN.

FIG. 11 shows an exemplary sequence of the processing performed when a telephone 2 connected to the public network 3 and a communication terminal 10 connected to the LAN 1 communicate with each other through the communication server 20 by a request from the communication terminal 10 connected to the LAN 1 in FIG. 1.

An arrow 401 represents a flow of operations performed by the communication terminal 10 connected to the LAN 1; an arrow 402 a flow of operations performed by the communication server 20 simultaneously connected to the LAN 1 and the public network 3; and an arrow 403 a flow of operations performed by the telephone 2 connected to the public network 3. When the user of the communication terminal selects a communication with a telephone (450), the communication terminal transmits a voice communication request to the communication server (451). The communication server, upon receiving the voice communication request, responsively transmits a call setting request to the telephone (452), and the telephone, in response to the reception of the call setting request, generates the ringing signal (453).

When the telephone user takes up the receiver (off-hook, 454), a call setting response is returned from the telephone to the communication server (455). The communication server, in response to the reception of this call setting response, transmits a voice communication response to the communication terminal (456), thereby entering a communication available state (457).

When the user hangs on the receiver (on-hook, 458), a call releasing request is transmitted from the telephone to the communication server (459). The communication server, in response to the reception of the call releasing request, returns a call releasing response to the telephone (461) and transmits a voice communication end notice to the communication terminal (460). The communication terminal, in response to the reception of the voice communication end notice, terminates the communication (462).

Figure 12:
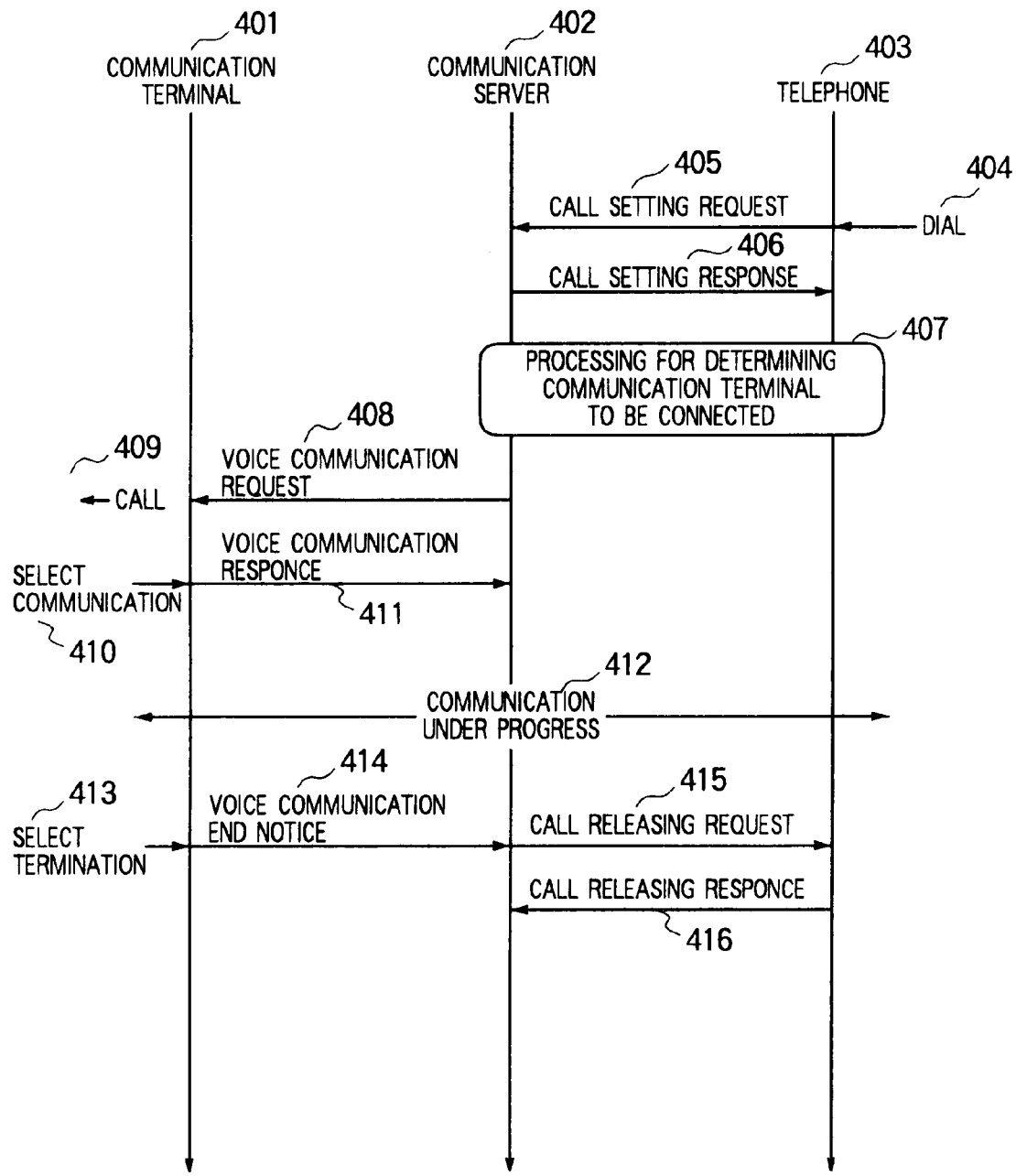
FIG. 12 is a sequence diagram showing a procedure followed by a communication terminal connected to LAN for making a call to a telephone connected to the public network through the communication server by a request from the telephone.

FIG. 12 shows an exemplary sequence of the processing performed when a telephone 2 connected to the public network 3 and a communication terminal 10 connected to the LAN 1 in FIG. 1 communicate with each other through the communication server 20 by a request from the telephone 2 connected to the public network 3. Arrows 401-403 shows flows of operations performed by the respective parts similarly to FIG. 11.

When the telephone user dials the telephone number of the communication server (404), a call setting request is transmitted from the telephone to the communication server (405). The communication server, in response to the reception of this call setting request, returns a call setting response to the telephone (406), and determines a communication terminal with which the telephone user desires to communicate through the communication server (407).

The communication server transmits a voice communication request to the communication terminal determined by the connected communication terminal determining step (407). The communication terminal receiving this voice communication request calls the user (409). If the user utilizing the communication terminal selects communication in response to the call (410), the communication terminal transmits a voice communication accepting response to the communication server (411), thereby entering an in-communication state (412).

If the user of the communication terminal selects termination of the communication (413), a voice communication end notice is transmitted from the communication terminal to the communication server (414). The communication server, in response to the reception of this voice communication end notice, transmits a call releasing request to the telephone (415). The telephone, in response to the reception of the call releasing request, transmits a call releasing response to the communication server (416). The reception of the call releasing response by the communication server results in terminating the communication processing between the telephone and the communication terminal.

Figure 13:
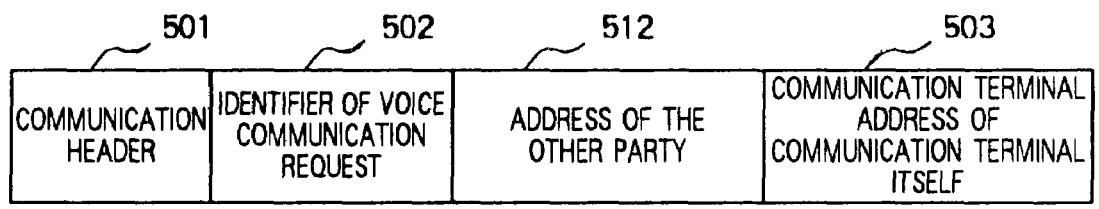
FIG. 13 shows the structure of a voice communication request command.

FIG. 13 shows the structure of a voice communication request command which is transmitted when a voice communication request is issued. A field 501 is assigned to a communication header used by the LAN communication controller; 502 to an identifier indicative of the voice communication request; 503 to the communication terminal address of a communication terminal itself which transmits the voice communication request; and 512 to the communication address of the other party to which the voice communication is requested. When the other party to be communicated is a communication terminal, the communication terminal address of the communication terminal is set as the address 512 of the other party. The destination address of such a voice communication request command is the communication terminal address. When the other party to be communicated is a telephone, its telephone number is set as the address 512 of the other party. The destination address of such a voice communication request command is the communication terminal address of the communication server. The communication terminal address 503 of the communication terminal transmitting the voice communication request may be omitted.

Figure 14:
FIG. 14 shows the structure of a voice communication response command.

FIG. 14 shows the structure of a voice communication response command which is an answer to the voice communication request. A field 501 is assigned to a communication header like that of the voice communication request command of FIG. 13. A field 504 is assigned to an identifier indicative of the voice communication response; and 505 to a result indicating whether or not a communication is performed in response to a voice communication request.

Figure 15:
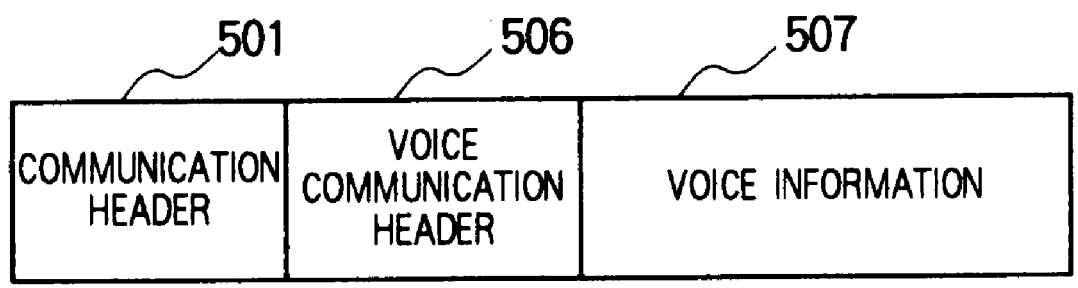
FIG. 15 shows the structure of a voice communication command.

FIG. 15 shows the structure of a voice communication command for transmitting and receiving voice information. A field 501 is assigned to a communication header like that of the voice communication request of FIG. 13. A field 506 is assigned to a voice communication header used for the communication processing, and 507 to encoded voice information.

Figure 16:
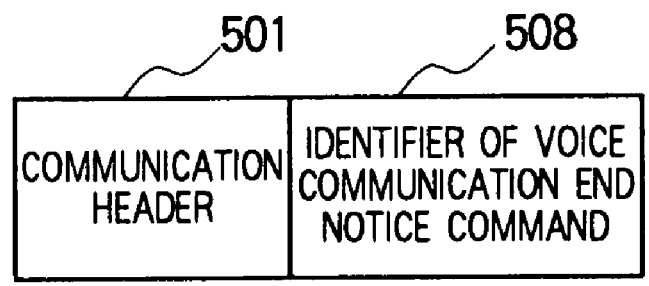
FIG. 16 shows the structure of a voice communication end notice command.

FIG. 16 shows the structure of a voice communication end notice command. A field 501 is assigned to a communication header like that of the voice communication request of FIG. 13. A field 508 is assigned to an identifier indicative of the voice communication end notice command.

Figure 17:
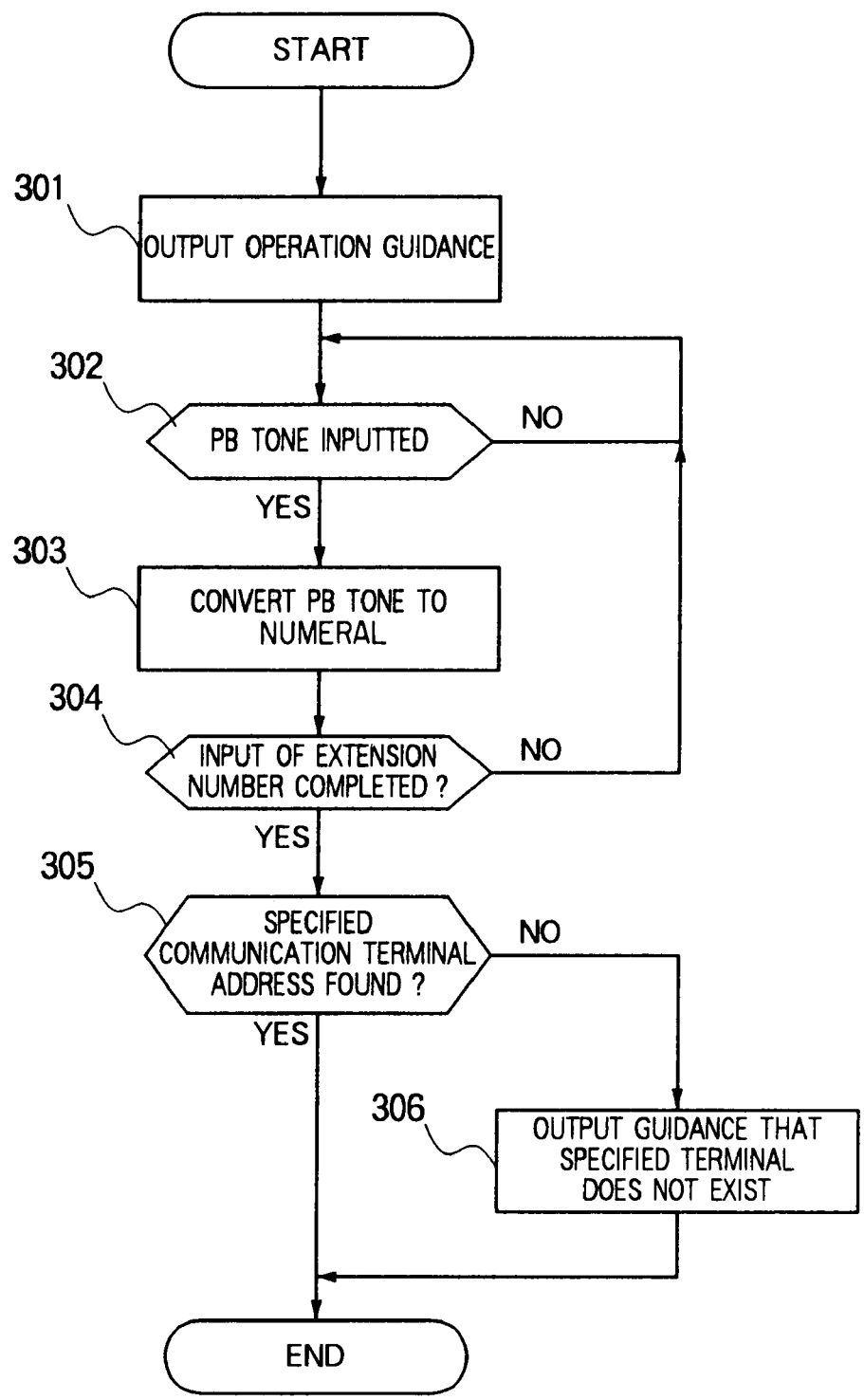
FIG. 17 is a flow chart showing the processing for determining a communication terminal with which a telephone user desires to communicate when using push buttons.

FIG. 17 shows a flow chart of the processing shown in step 203 of FIG. 8 and denoted by reference numeral 407 in FIG. 12 for determining a communication terminal with which a telephone user desires to communicate. Given herein as an example is the processing of determining a communication terminal to be communicated by using push buttons of the telephone.

First, at step 301, an operation guidance saying "Input an extension number through push buttons and depress '#' after the extension number" is outputted to the telephone. Next, at step 302, the input operation of the user through the push buttons is awaited, and a tone corresponding to a depressed push button is converted to a numeral and stored. Then, it is determined at step 304 whether or not the input of an extension number is completed by checking whether the tone corresponding to the depressed push button represents '#'. If it is determined that the input of an extension number is not terminated, the flow returns to step 302 to wait for the user to input a numeral through a push button.

At step 304, if the input of an extension number has been terminated, the communication terminal address of a communication terminal having the inputted extension number is found from an extension number management table to determine the address of a communication terminal with which the telephone user desires to communicate. The extension number management table will be later described in detail with reference to FIG. 18.

When the communication terminal address can be found at step 305, this communication terminal determining processing is terminated. Conversely, if the communication terminal address cannot be found at step 305, a guidance saying "There is no communication terminal having the inputted extension number" is outputted to the telephone, and the processing is terminated with a conclusion that a communication terminal with which the user desires to communicate was not able to be determined.

The messages outputted at steps 301, 306 may have different contents. Also, the symbol '#' for indicating that the input of an extension number is completed may be replaced with a different symbol. Further, respective communication terminals connected to the LAN may be assigned unique telephone numbers such that a communication is requested with the telephone number thus assigned from a telephone connected to the telephone network. In this case, the communication server holds telephone numbers of all the communication terminals connected to the LAN. In actual processing for realizing this alternative, steps 301-304 in FIG. 17 are omitted, and a pertinent communication terminal address may be found based on a telephone number inputted from the telephone at step 305.

FIG. 18 shows the structure of the extension number management table which has been referred to at step 305 in FIG. 17. A column 311 is provided for the extension number, and column 312 for a communication terminal address corresponding to the extension number. If the communication server holds telephone numbers for a number of communication terminals connected to the LAN, the column 311 for the extension number may be used for storing telephone numbers assigned to respective communication terminals.

Figure 19:
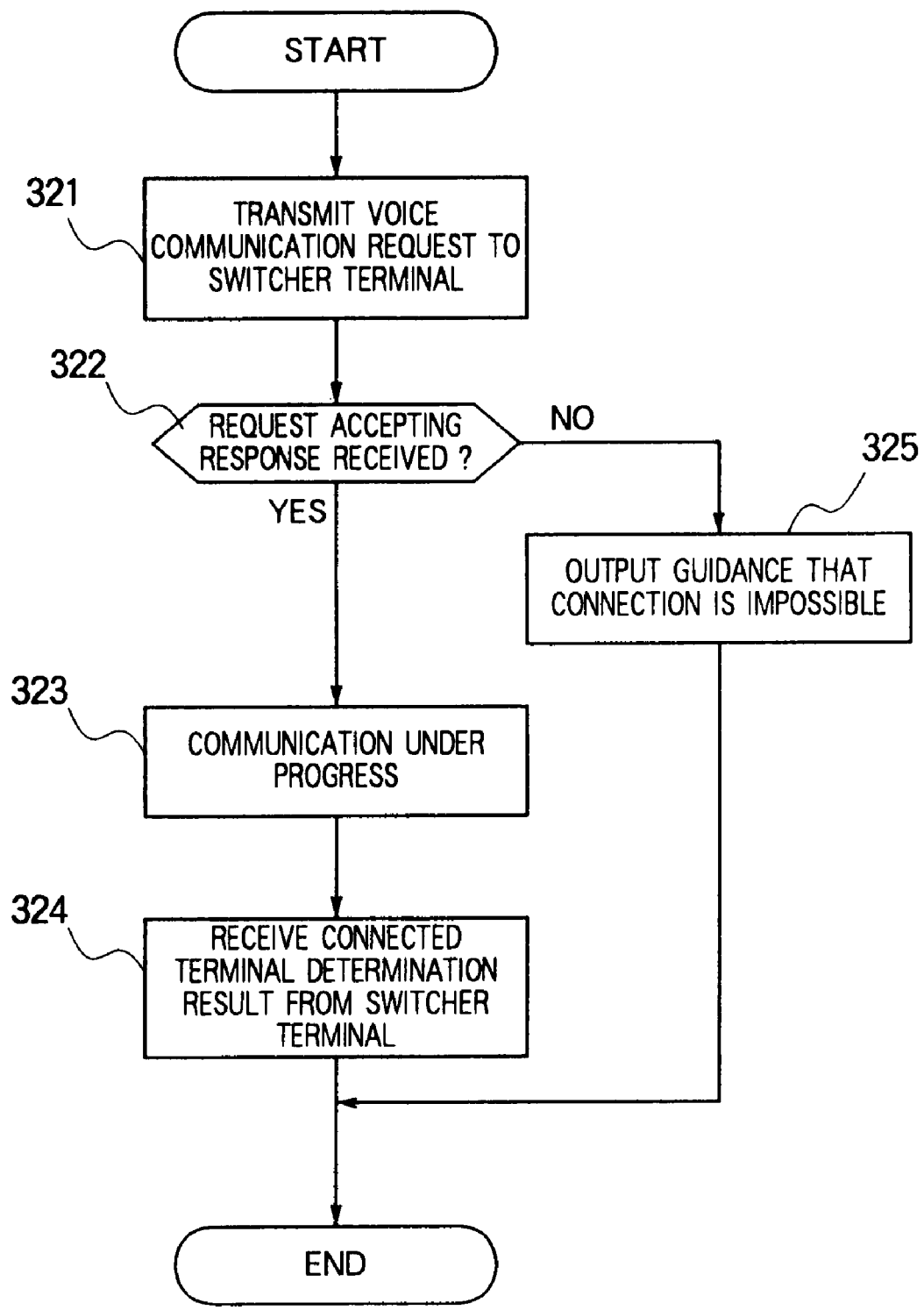
FIG. 19 is a flow chart showing the processing for determining a communication terminal with which a telephone user desires to communicate when a communication terminal on the LAN is utilized as a switcher terminal.

FIG. 19 is a flow chart showing another example of the processing shown in step 203 of FIG. 8 and denoted by reference numeral 407 in FIG. 12 for determining a communication terminal with which a telephone user desires to communicate. This example shows how to determine a desired communication terminal by utilizing a communication terminal connected to the LAN as a switcher terminal.

First, at step 321, a voice communication request is transmitted to the switcher terminal, and it is determined at step 322 whether or not an accepting response has been received from the switcher terminal. If the accepting response has been received, the communication processing is performed between the switcher terminal and a telephone at step 323. After the termination of the communication processing, by a connected terminal determination notice received from the switcher terminal, the result of whether the address of a communication terminal has been determined or not is acquired at step 324. When a negating response is received from the switcher terminal at step 322, a message saying that a connection was impossible is outputted to the telephone at step 325, thus concluding that no communication terminal was determined.

Figure 20:
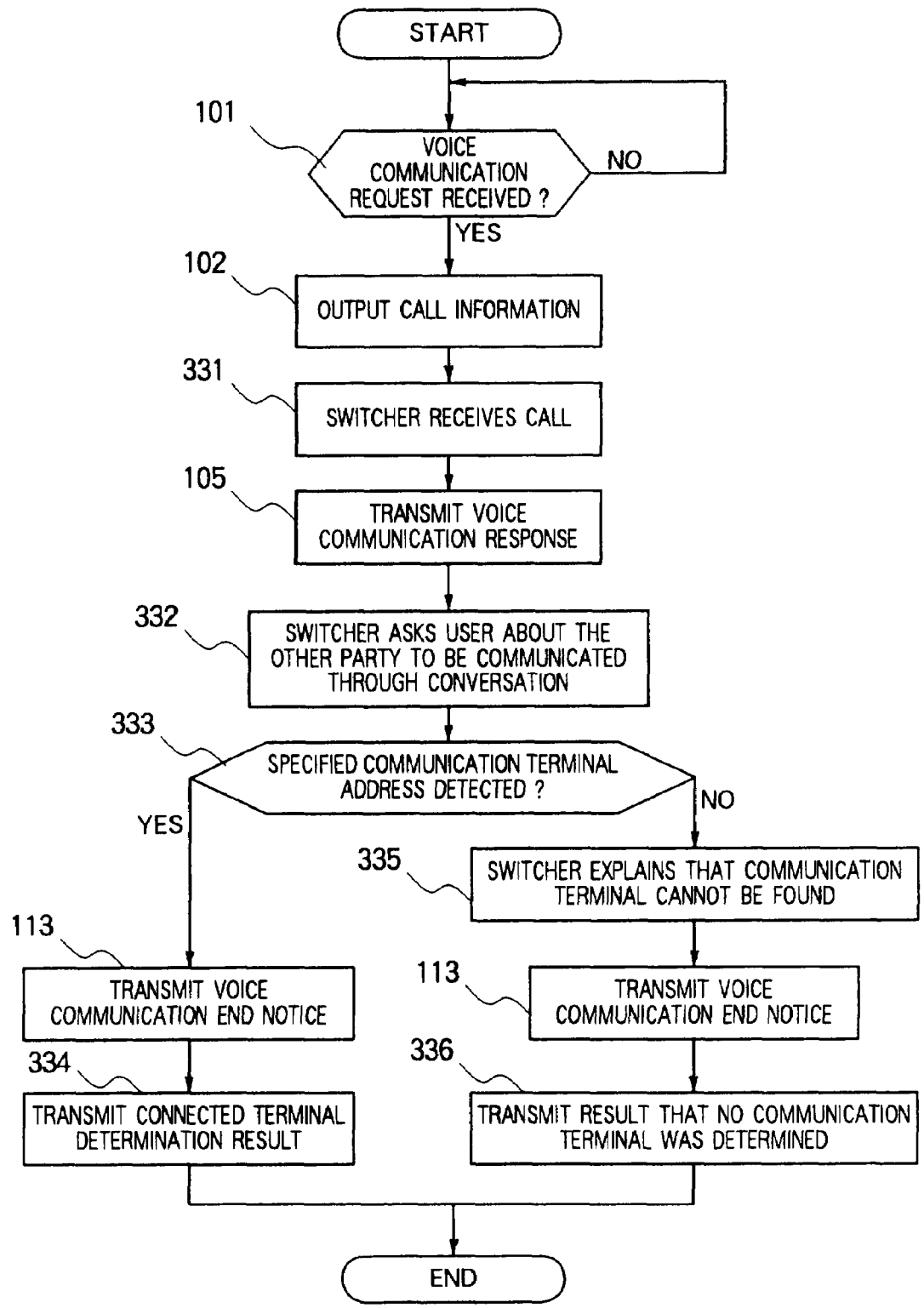
FIG. 20 is a flow chart showing the processing performed by the switcher terminal.

FIG. 20 shows a flow chart of the processing performed by the switcher terminal for determining a communication terminal with which a communication is desired, using the switcher terminal such as the processing of FIG. 19.

Steps 101, 102 perform similar processing to the corresponding steps in FIG. 4. Specifically, reception of a voice communication request is awaited at step 101, and when the voice communication request is received from the communication server, a call is outputted at step 102. In response to this call output, a switcher receives the call at the switcher terminal at step 331. Then, a voice communication response is returned at step 105. This step 105 is the same as step 105 in FIG. 4.

After returning the voice communication response, the switcher has a conversation with a telephone user at step 332 to find out the extension number or name of the other party with whom the user desires to communicate, searches the communication terminal address management table for the communication terminal address based on the information at step 333. If the switcher can find the communication terminal address at step 333, a voice communication end notice is transmitted at step 113 to terminate the conversation with the telephone user. Then, a connected terminal determination notice including the detected communication terminal address is transmitted to the communication server at step 334, thus terminating the processing.

If the communication terminal address cannot be found at step 333, the switcher orally explains the telephone user at step 335 that no communication terminal conforming to the user's information has been found. Thereafter, a voice communication end notice is transmitted at step 113 to terminate the conversation with the telephone user, and a connected terminal determination notice is transmitted to the communication server at step 336 for informing that no communication terminal was determined. Thus, the processing is terminated.

Figures 21, 22:
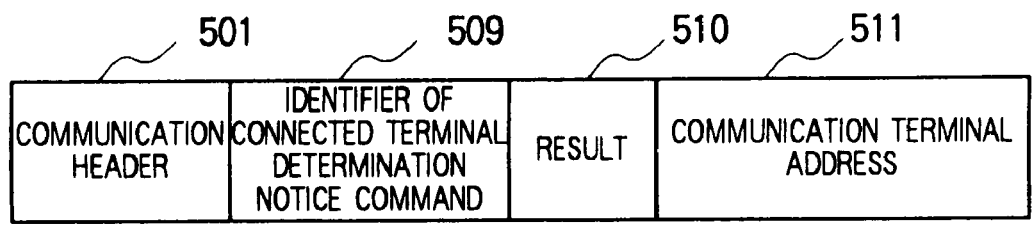
FIG. 21 shows the structure of a connected terminal determination notice command.
FIG. 22 shows the structure of a communication terminal address management table.

FIG. 21 shows the structure of a connected terminal determination notice command. A field 501 is assigned to a communication header like that of the voice communication request of FIG. 13; 509 to an identifier indicating that this command is the connected terminal determination notice command; 510 to a result indicating whether or not a communication terminal address has been determined; and 511 to the communication terminal address of a communication terminal to be connected. The communication terminal address 511 is valid only when the result 510 indicates that the communication terminal address has been determined. If the result 510 indicates that the communication terminal address has not been determined, the communication terminal address 511 is omitted.

FIG. 22 shows the structure of the communication terminal address management table used when a communication terminal with which the user desires to communicate is determined by utilizing the switcher terminal, as explained in connection with FIGS. 19-21. Columns 311 and 312 for extension number and communication terminal address are the same as those in FIG. 18. A column 337 is additionally provided for storing names of users. This table enables the switcher to search for the communication terminal address from the name, when the telephone user inputs the name to specify a person with whom he desires to communicate.

Figure 23:
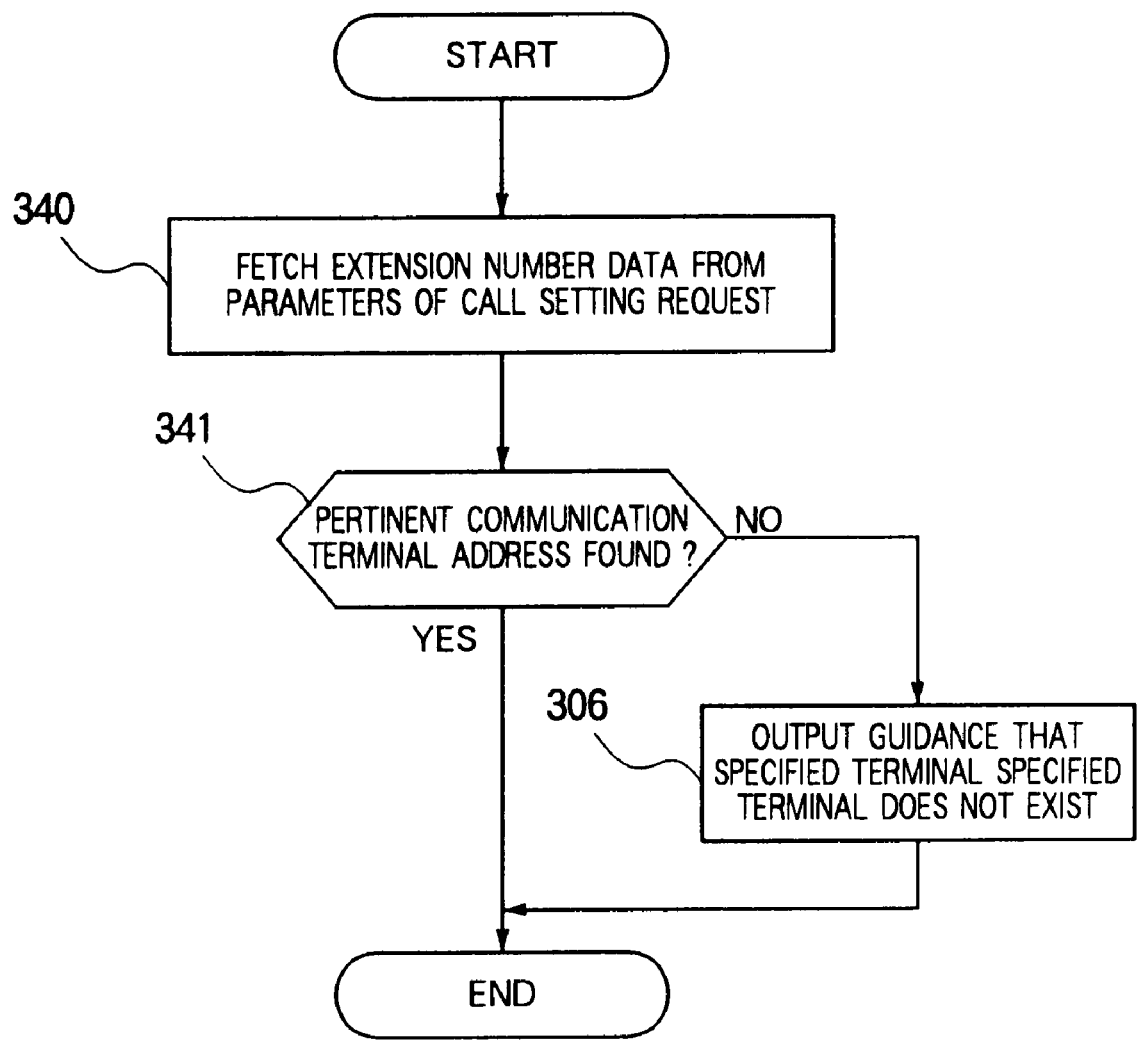
FIG. 23 is a flow chart showing the processing for determining a communication terminal with which a telephone user desires to communicate when the public network is ISDN.

FIG. 23 is a flow chart showing a further example of the processing shown in step 203 of FIG. 8 and denoted by reference numeral 407 in FIG. 12 for determining a communication terminal with which the telephone user desires to communicate.

Assume, in this example, that the communication network is ISDN (Integrated Services Digital Network). In accordance with the ISDN, a variety of parameters can be set to messages running through the line. Thus, in this example, an extension number specified by the user is added to user information or communication address in a call setting request sent from a telephone, so that the call setting request is transmitted together with the extension number. In the connected communication terminal determination processing of FIG. 23, the extension number in the call setting request is acquired for determining a communication terminal.

First, at step 340, data on extension number is fetched from parameters in the call setting request. Next, at step 341, the communication terminal address of the pertinent extension number is found from the extension number management table, the structure of which is shown in FIG. 18. When the communication address can be found, it is determined as the address of a communication terminal to be connected, followed by the termination of the processing. Conversely, if no communication terminal address corresponding to the fetched extension number can be found at step 341, the processing is terminated with a conclusion that the communication terminal address has not been determined.

As a modified example of the present invention, the LAN communication controller 14 shown in FIG. 2 may be adapted to simultaneously support a plurality of communication protocols, for example, TCP/IP protocol and UDP/IP protocol, such that the voice communication packet is transmitted utilizing the UDP/IP protocol in the processing flows shown in FIGS. 4 and 10, and control information such as the voice communication request command and voice communication end notice command shown in FIG. 5 and the connected terminal determination result notice command shown in FIG. 19 are transmitted utilizing the TCP/IP protocol. The appropriate use of different protocols in this way will prevent a delay in the arrival of the voice communication packets and reliably control the start, termination, and so on of the voice communication.

According to the present invention, when the user utilizing a communication terminal on the LAN inputs a communication terminal address, communication terminals on the LAN can directly communicate with each other without intervention of the communication server. In addition, when the user utilizing a communication terminal on the LAN inputs a telephone number, a communication between the communication terminal on the LAN and a telephone connected to a public network is enabled through the communication server which is simultaneously connected to the LAN and public network.

Also, according to the foregoing embodiment, if the user utilizing a communication terminal on the LAN cannot realize a voice communication with a communication terminal on the LAN after attempts of doing so, a variety of mails can be sent to the communication terminal of the other party without requiring the user to start another program or input a communication address.

Further, according to the foregoing embodiment, since the communication server which is simultaneously connected to the LAN and public network provides a function of specifying a communication terminal from a telephone, the telephone which cannot directly specify a communication terminal on the LAN can also initiate a call to a communication terminal on the LAN.

What is claimed is:

1. A voice communication server performing a voice communication process between a telephone connected to a line switching network employing a telephone number scheme and a plurality of communication devices connected to a packet switching network employing a communication address scheme which is different from the telephone number scheme, comprising:

a processor which:

receives a call setting request from the telephone, the call setting request including a number according to the telephone number scheme for identifying one of the communication devices as a communication partner;

transmits a call setting response in response to the call setting request;

obtains the communication address of the communication device according to the communication address scheme identified by the telephone number in the call setting request;

transmits a voice communication request packet, whose destination is the obtained communication address, to the packet switching network for requesting the communication device to communicate with the telephone;

receives a voice communication response packet in response to the voice communication request packet from the communication device to which the obtained communication address is assigned; and performs the voice communication process between the telephone and the communication device when the voice communication response packet indicates an accepting response;

wherein the voice communication request packet includes the communication address, according to the communication address scheme, which identifies the voice communication server in the packet switching network and the communication address, according to the communication address scheme, which identifies the communication device in the packet switching network.

2. The voice communication server according to claim 1, further comprising:

a correspondence table for corresponding the number identifying the communication device according to the telephone number scheme with the communication address of the communication device according to the communication address scheme, wherein the processor obtains the communication address according to the communication address scheme based on the correspondence table.

3. The voice communication server according to claim 1, wherein the processor:

converts the received voice information to the voice packet and converts the received voice packet to the voice information;

transmits the converted voice packet to the communication device; and transmits the converted voice information to the telephone.

4. The voice communication server according to claim 3, wherein the packet switching network is a TCP/IP network and the processor controls TCP/IP.

5. The voice communication server according to claim 3, wherein the packet switching network is a UDP/IP network and the processor controls UDP/IP.

6. The voice communication server according to claim 1, wherein the processor transmits a voice communication negating response to the line switching network, when the voice communication response packet indicates a negating response.

7. The voice communication server according to claim 1, wherein the packet switching network is a TCP/IP network and the processor controls TCP/IP.

8. The voice communication server according to claim 1, wherein the packet switching network is a UDP/IP network and the processor controls UDP/IP.

9. The voice communication server according to claim 1, wherein the packet switching network is a Local Area Network (LAN).

10. The voice communication server according to claim 1, wherein the processor transmits the voice communication request packet using TCP; and
transmits the voice packet using UDP.

11. The voice communication server according to claim 1, wherein the processor transmits guidance for inputting voice mail to the telephone, when the voice communication response packet indicates a negating response.

12. A voice communication server performing a voice communication process between a telephone connected to a line switching network employing a telephone number scheme and a plurality of communication devices connected to a packet switching network employing a communication address scheme which is different from the telephone number scheme, comprising:
a processor which;
receives a call setting request from the telephone, the call setting request specifying the voice communication server;
transmits a call setting response in response to the call setting request;
accepts input of a number identifying one of the communication devices from the telephone after transmitting the call setting response;
obtains the communication address of the communication device according to the communication address scheme based on the input number;
transmits a voice communication request packet, whose destination is the obtained communication address, to the packet switching network for requesting the communication device to communicate with the telephone; and
receives a voice communication response packet in response to the voice communication request packet from the communication device to which the obtained communication address is assigned,
wherein the voice communication request packet includes the communication address, according to the communication address scheme, which identifies the voice communication server in the packet switching network and the communication address, according to the communication address scheme, which identifies the communication device in the packet switching network.

13. A voice communication server performing a voice communication process between a telephone connected to a line switching network employing a telephone number scheme and a plurality of communication devices connected to a packet switching network employing a communication address scheme which is different from the telephone number scheme, comprising:
a processor which:
receives a call setting request from the line switching network, the call setting request specifying the voice communication server and including a number identifying one of the communication devices;
transmits a call setting response in response to the call setting request;
obtains the communication address of the communication device according to the communication address scheme based on the number included in the call setting request;
transmits a voice communication request packet, whose destination is the obtained communication address, to the packet switching network for requesting the communication device to communicate with the telephone; and
receives a voice communication response packet in response to the voice communication request packet from the communication device to which the obtained communication address is assigned,
wherein the voice communication request packet includes the communication address, according to the communication address scheme, which identifies the voice communication server in the packet switching network and the communication address, according to the communication address scheme, which identifies the communication device in the packet switching network.

14. The voice communication server according to claim 13, further comprising:
a correspondence table for corresponding the number identifying the communication device according to the telephone number scheme with the communication address of the communication device according to the communication address scheme,
wherein the processor obtains the communication address according to the communication address scheme based on the correspondence table.

15. The voice communication server according to claim 13, wherein the processor performs the voice communication process between the telephone and the communication device transmitting an accepting response, when the voice communication response packet indicates the accepting response,
converts the received voice information to the voice packet and converting the received voice packet to the voice information;
transmits the converted voice packet to the communication device; and
transmits the converted voice information to the telephone.

16. The voice communication server according to claim 15, wherein the packet switching network is a TCP/IP network and the processor uses TCP/IP.

17. The voice communication server according to claim 15, wherein the packet switching network is UDP/IP network and the processor controls UDP/IP.

18. The voice communication server according to claim 15, wherein the processor transmits the voice communication request packet using TCP; and
transmits the voice packet using UDP.

19. The voice communication server according to claim 13, wherein the processor transmits a voice communication negating response to the line switching network, when the voice communication response packet indicates a negating response.

20. The voice communication server according to claim 13, wherein the packet switching network is a TCP/IP network, and the processor uses TCP/IP.

21. The voice communication server according to claim 13, wherein the packet switching network is a UDP/IP network and the processor uses UDP/IP.

22. The voice communication server according to claim 14, wherein the processor transmits guidance for inputting voice mail to the telephone, when the voice communication response packet indicates a negating response.

23. The voice communication server according to claim 13, wherein the packet switching network is a Local Area Network (LAN).

* * * * *